(12) United States Patent
Afsharian et al.

(10) Patent No.: US 10,199,927 B2
(45) Date of Patent: Feb. 5, 2019

(54) PWM SCHEME BASED ON SPACE VECTOR MODULATION FOR THREE-PHASE RECTIFIER CONVERTERS

(71) Applicant: Murata Manufacturing Co., Ltd., Nagaokakyo-shi, Kyoto-fu (JP)

(72) Inventors: Jahangir Afsharian, Markham (CA); Dewei Xu, Markham (CA); Bing Gong, Markham (CA); Zhihua Yang, Markham (CA)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/760,837

(22) PCT Filed: Sep. 17, 2016

(86) PCT No.: PCT/US2016/052382
§ 371 (c)(1),
(2) Date: Mar. 16, 2018

(87) PCT Pub. No.: WO2017/049250
PCT Pub. Date: Mar. 23, 2017

(65) Prior Publication Data
US 2018/0262103 A1  Sep. 13, 2018

Related U.S. Application Data

(60) Provisional application No. 62/220,471, filed on Sep. 18, 2015.

(51) Int. Cl.
*H02M 3/335* (2006.01)
*H02M 1/42* (2007.01)
(Continued)

(52) U.S. Cl.
CPC ....... *H02M 1/4258* (2013.01); *H02M 1/4233* (2013.01); *H02M 7/219* (2013.01);
(Continued)

(58) Field of Classification Search
CPC .... H02M 7/162; H02M 7/1626; H02M 7/527; H02M 5/297; H02M 5/293; H02M 3/156;
(Continued)

(56) References Cited

U.S. PATENT DOCUMENTS 5,329,439 A    7/1994  Borojevic et al.
7,044,723 B2 *  5/2006  Morozumi .......... F04C 18/0215
                                                184/6.18
(Continued)

FOREIGN PATENT DOCUMENTS

WO    2015/0300359 A1    3/2015

OTHER PUBLICATIONS

Official Communication issued in International Patent Application No. PCT/US2016/052382, dated Dec. 27, 2016.
(Continued)

*Primary Examiner* — Rajnikant Patel
(74) *Attorney, Agent, or Firm* — Keating & Bennett, LLP

(57) ABSTRACT

A matrix rectifier includes a bridge x defined by phases A and B and a bridge y defined by phases A and C, in which each input phases A, B, and C includes two bi-directional switches connected in series. A method of operating the matrix rectifier includes operating the bridges x and y as independent full-bridge phase-shifted converters in each 60° interval between two successive zero-voltage crossings of the input phases A, B, and C. In a first 30° sector of each 60° interval, the bridges x and y are operated in a first vector sequence in every switching period, and the first vector
(Continued)

Topology of isolated three-phase PWM rectifier sequence is divided into a sequence of $\vec{I}_{x+}$, $\vec{I}_{y+}$, $\vec{I}_0$, $\vec{I}_{x-}$, $\vec{I}_{y-}$, $\vec{I}_0$.

10 Claims, 25 Drawing Sheets

(51) Int. Cl.
  *H02M 7/219* (2006.01)
  *H02M 1/00* (2006.01)
  *H02M 1/12* (2006.01)
  *H02M 1/14* (2006.01)

(52) U.S. Cl.
  CPC .............. *H02M 1/126* (2013.01); *H02M 1/14* (2013.01); *H02M 2001/0058* (2013.01); *Y02B 70/126* (2013.01); *Y02B 70/1491* (2013.01)

(58) Field of Classification Search
  CPC ....... H02M 1/12; H02M 3/158; Y02B 70/126; Y02B 70/1441
  USPC .................................. 363/15–19, 34, 37, 40
  See application file for complete search history.

(56) References Cited

U.S. PATENT DOCUMENTS

| | | | |
|---|---|---|---|
| 7,518,886 B1 | 4/2009 | Lai et al. | |
| 7,599,196 B2* | 10/2009 | Alexander | H02M 3/1582 363/13 |
| 7,944,223 B2* | 5/2011 | Chang | G01R 31/2863 324/750.05 |
| 9,973,107 B2* | 5/2018 | Cerqueira Pinto Bezerra Varajao | H02M 5/297 |
| 2010/0149848 A1 | 6/2010 | Urushibata et al. | |
| 2011/0149621 A1 | 6/2011 | Damson et al. | |
| 2012/0201056 A1 | 8/2012 | Wei et al. | |
| 2016/0049880 A1 | 2/2016 | Kim et al. | |

OTHER PUBLICATIONS

Vlatkovic et al., "A Zero-Voltage Switched, Three-Phase Isolated PWM Buck Rectifier", IEEE Transactions on Power Electronics, vol. 10, No. 2, Mar. 1995, pp. 148-157.
Wu, "High-Power Converters and AC Drivers", The Institute of Electrical and Electronics Engineers, Inc., 2006, www.knovel.com, 31 pages.
Wheeler et al., "Matrix Converters: A Technology Review", IEEE Transactions on Industrial Electronics, vol. 49, No. 2, Apr. 2002, pp. 276-288.
Huber et al., "Space Vector Modulator for Forced Commutated Cycloconverters", Conf. Rec. IEE-IAS Annual Meeting, 1989, pp. 871-876.
Huber et al., "Space Vector Modulated Three-Phase to Three-Phase Matrix Converter with Input Power Factor Correction", IEEE Transactions on Industry Applications, vol. 31, No. 6, Nov./Dec. 1995, pp. 1234-1246.
Ishiguro et al., "A Novel Control Method for Forced Commutated Cycloconverters Using Instantaneous Values of Input Line-to-Line Voltages", IEEE Transactions on Industrial Electronics, vol. 38, No. 3, Jun. 1991, pp. 166-172.
Vlatkovic et al., "Digital-Signal-Processor-Based Control of Three-Phase Space Vector Modulated Converters", IEEE Transactions on Industrial Electronics, vol. 41, No. 3, Jun. 1994, pp. 326-332.
Manias et al., "A Novel Sinewave in AC to DC Converter with High-Frequency Transformer Isolation", IEEE Transactions on Industrial Electronics, vol. IE-32, No. 4, Nov. 1985, pp. 430-438.
Inagaki et al., "A New Pwm Control Method for ac to dc Converters with High-Frequency Transformer Isolation", IEEE Transactions on Industry Applications, vol. 29, No. 3, May/Jun. 1993, pp. 486-492.
Garcia-Gil et al., "A Bidirectional and Isolated Three-Phase Rectifier With Soft-Switching Operation", IEEE Transactions on Industrial Electronics, vol. 52, No. 3, Jun. 2005, pp. 765-773.
Ratanapanachote et al., "A Digitally Controlled Switch Mode Power Supply Based on Matrix Converter", IEEE Transactions on Power Electronics, vol. 21, No. 1, Jan. 2006, pp. 124-130.
Yan et al., "A Novel Absolute Value Logic SPWM Control Strategy Based on De-Re-Coupling Idea for High Frequency Link Matrix Rectifier", IEEE Transactions on Industrial Informatics, vol. 9, No. 2, May 2013, pp. 1188-1198.

* cited by examiner

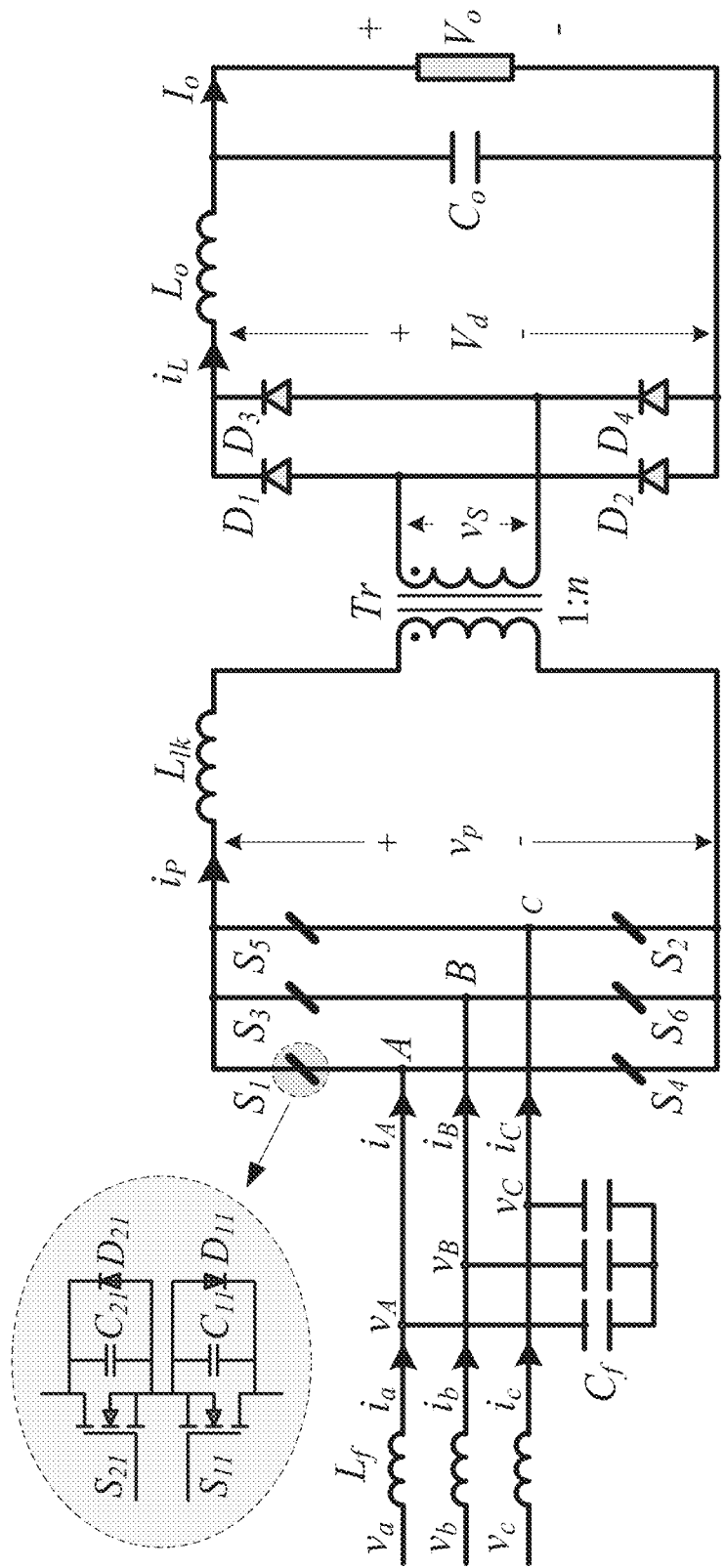
Fig. 1: Topology of isolated three-phase PWM rectifier

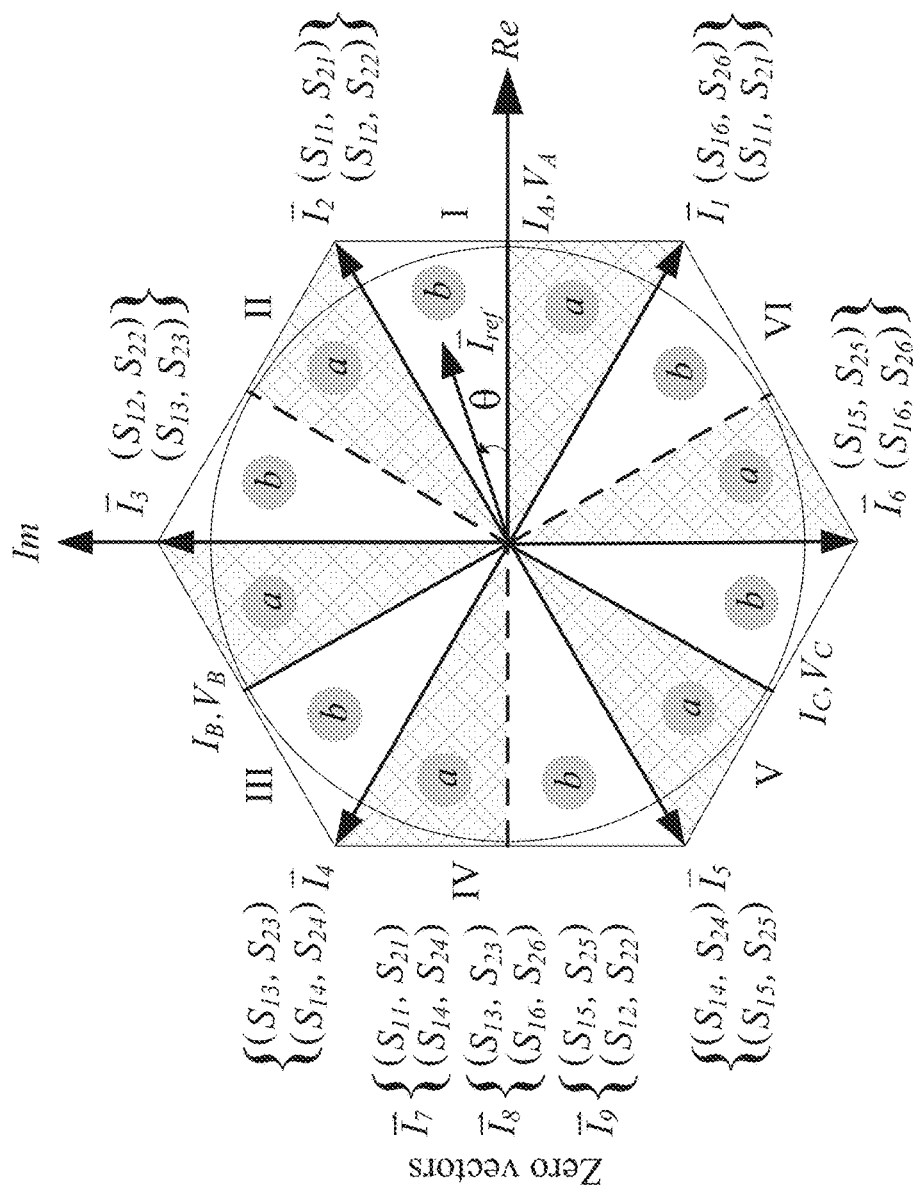
Fig. 2A: $i_P = nI_L$, $V_P > 0$.
Current space vector representation

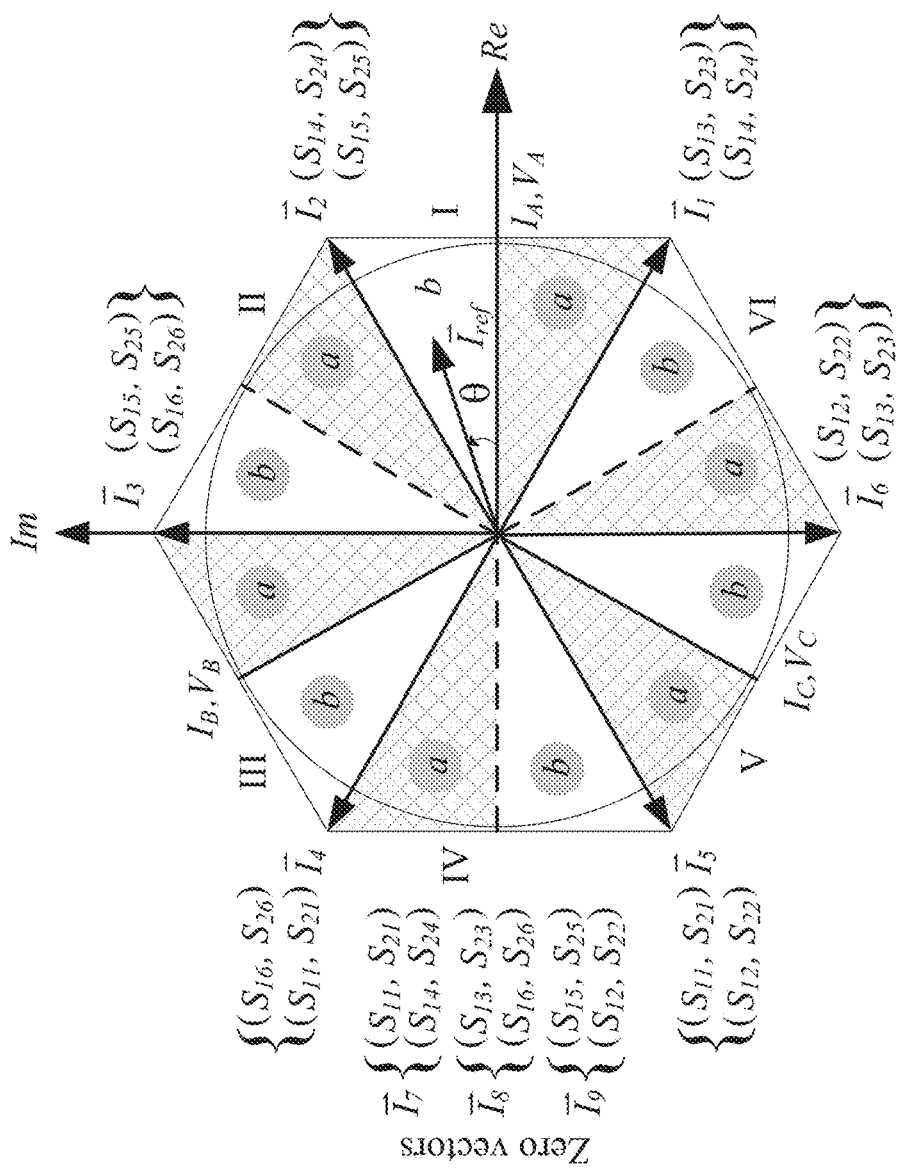
Fig. 2B: $i_P = -nI_L$, $V_P < 0$.
Current space vector representation

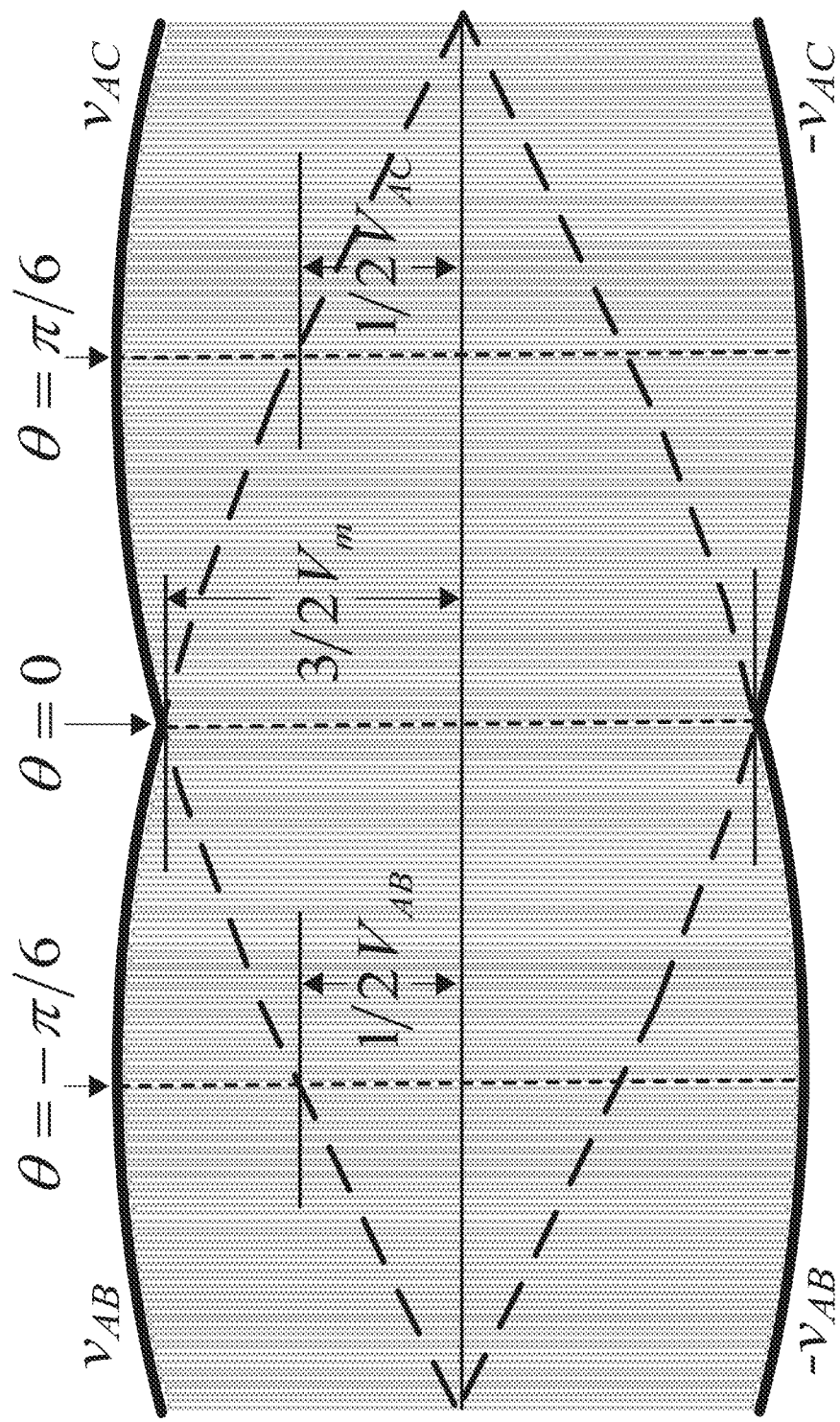
Fig. 2C: Envelop of transformer primary voltage $v_P$.

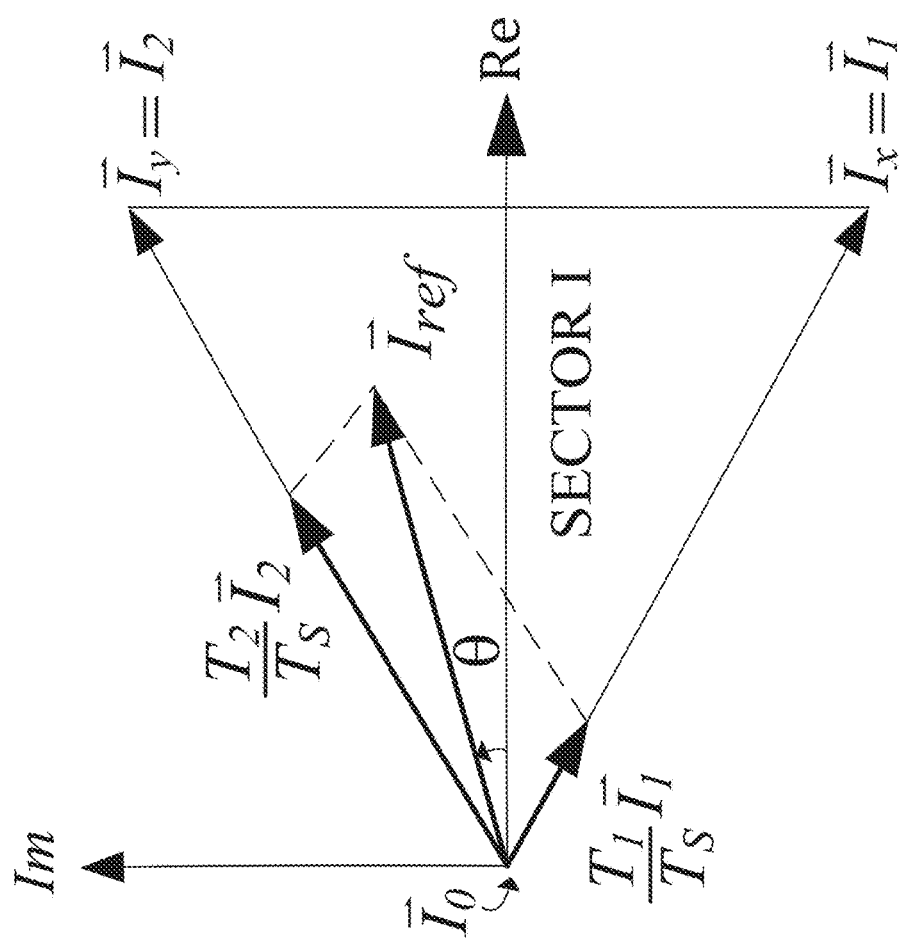
Fig. 3: Synthesis of $\vec{I}_{ref}$ by $\vec{I}_1$, $\vec{I}_2$, and, $\vec{I}_0$.

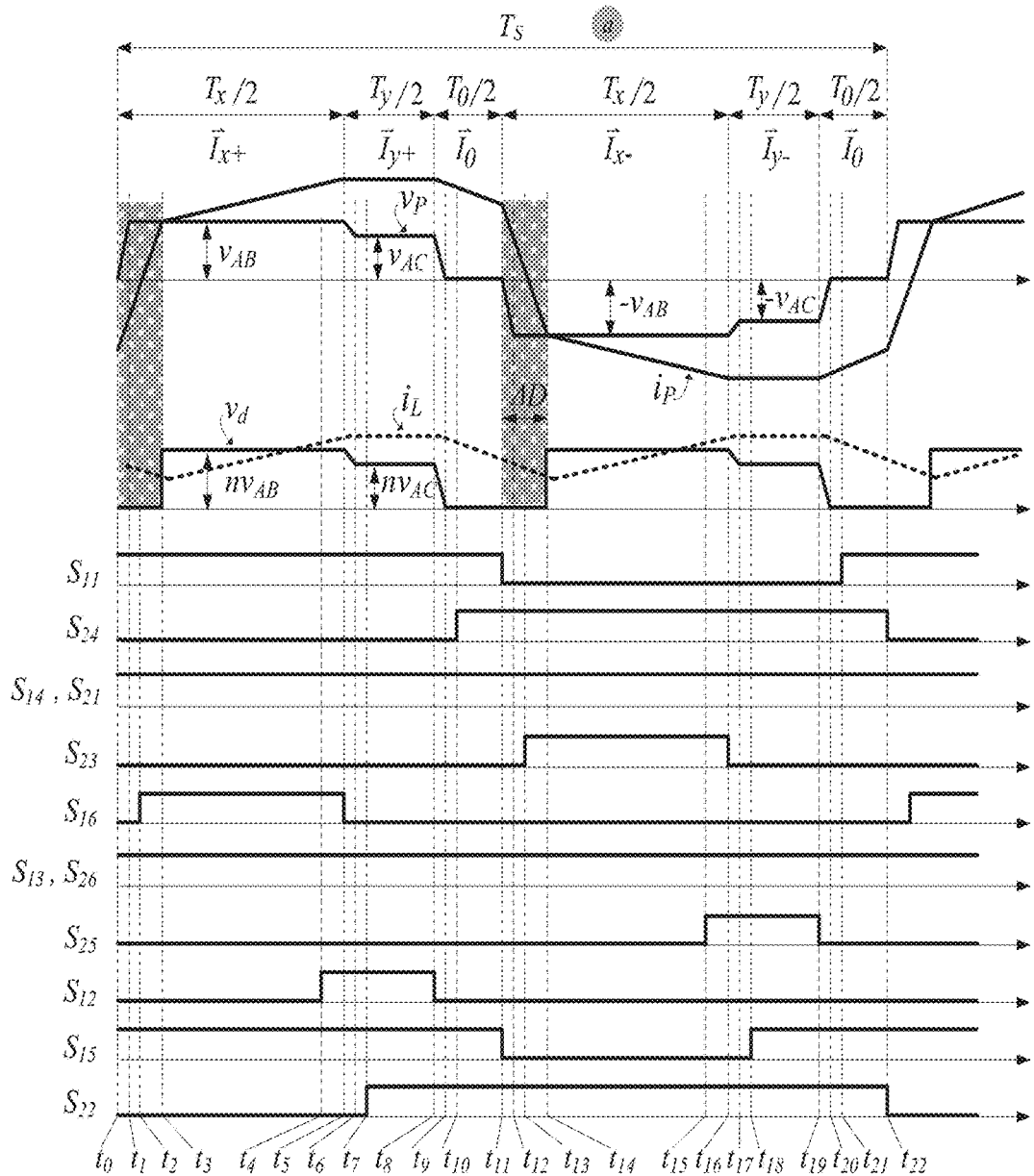
Fig. 4A: Sector I(a) when $\theta \in \left[-\frac{\pi}{6}, 0\right]$, $v_{AB} > v_{AC}$.
Circuit waveforms: primary voltage and current, rectified secondary voltage, output inductor current, and corresponding switch gate signals.

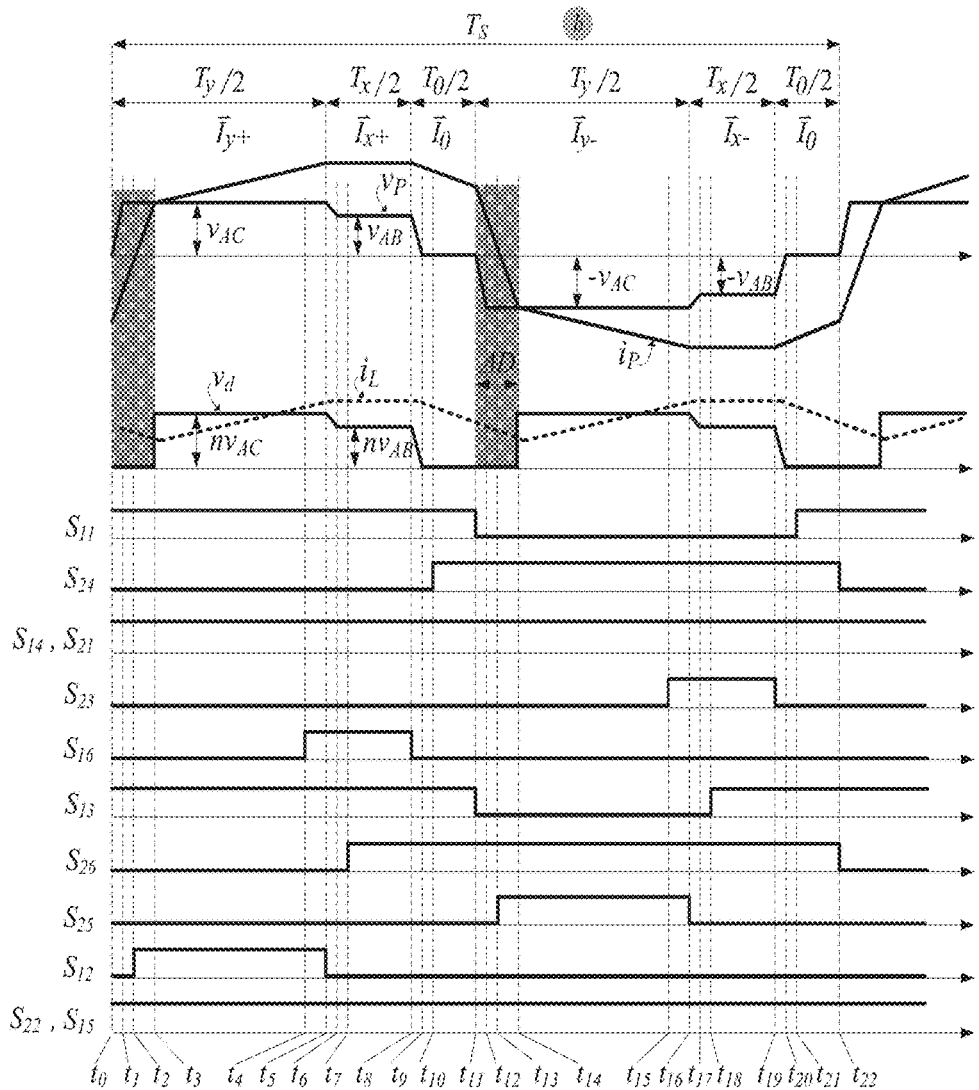
Fig. 4B: Sector I(b) when $\theta \in \left[0, \frac{\pi}{6}\right]$, $v_{AC} > v_{AB}$.
Circuit waveforms: primary voltage and current, rectified secondary voltage, output inductor current, and corresponding switch gate signals.

Duty Cycle Loss Comparison
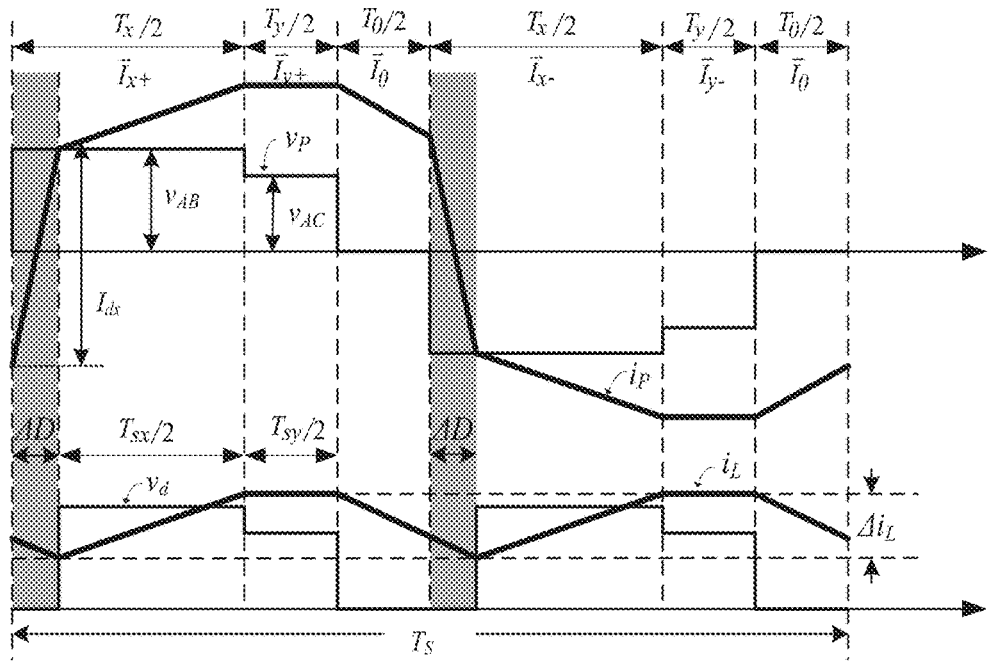
Fig. 5A: PWM scheme of a preferred embodiment
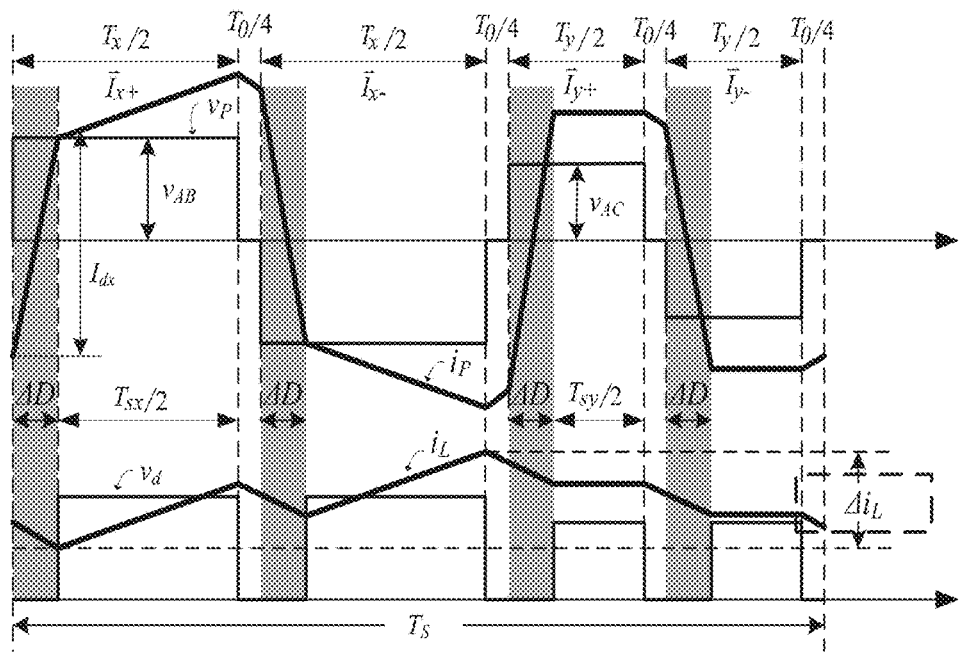
Fig. 5B: Prior Art PWM scheme of Vlatković et al.

Envelopes of output-inductor current ripple
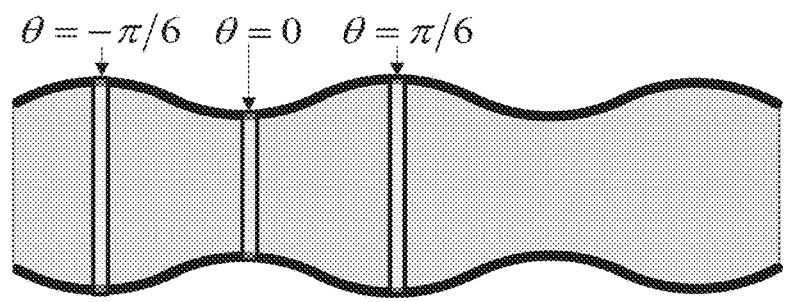
Fig. 6A: With PWM according to preferred embodiment of the present invention
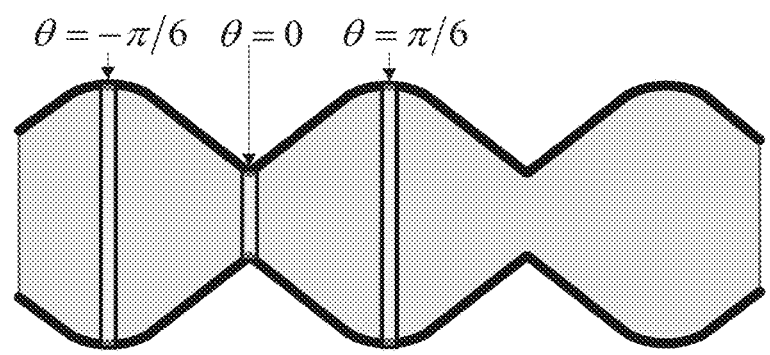
Fig. 6B: With Prior Art PWM of Wu.

Close-up view of waveforms of maximum current ripple of the current envelope in Fig. 6
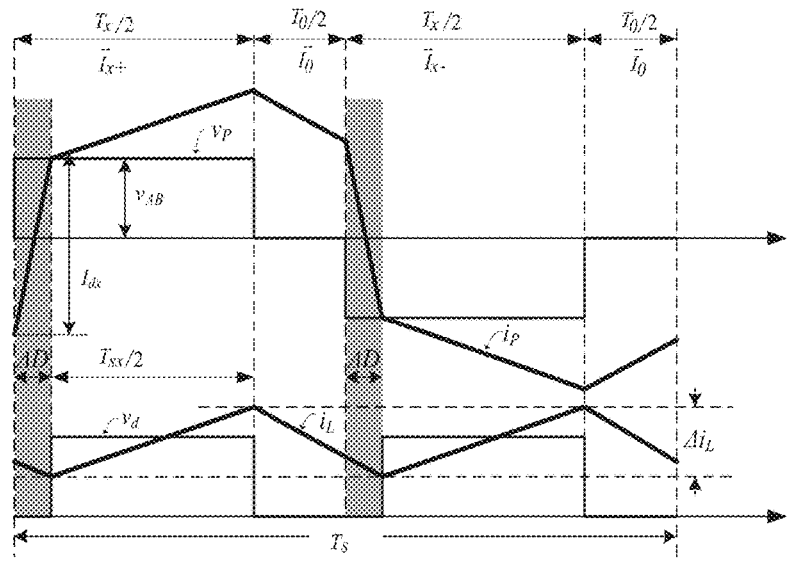
Fig. 7A: With PWM at $= -\frac{\pi}{6}$.
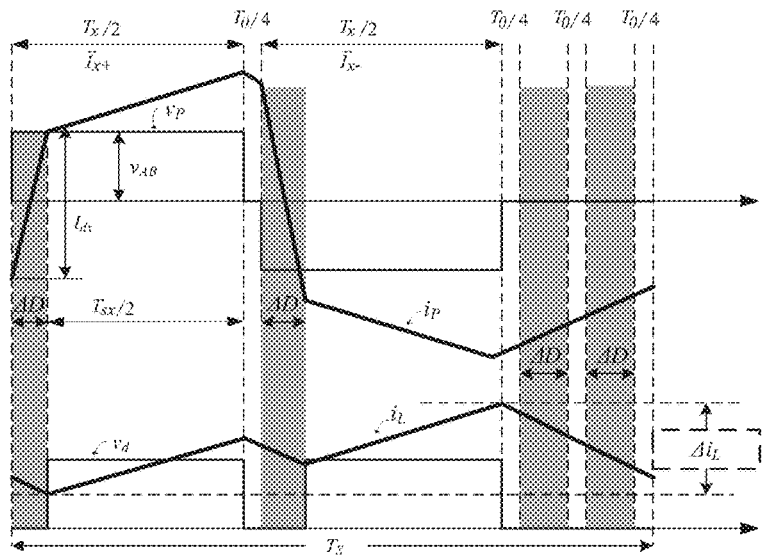
Fig. 7B: With Prior Art PWM of Wu at $= -\frac{\pi}{6}$.

Simulation comparison of the PWM of a preferred embodiment of the present invention and the Prior Art PWM of Vlatković et al.
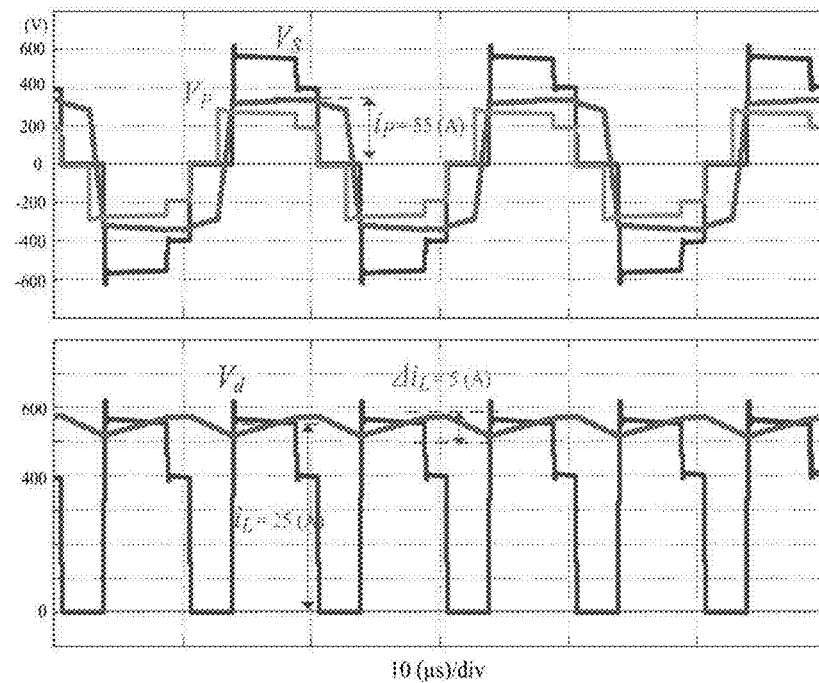
Fig. 8A: PWM of preferred embodiment
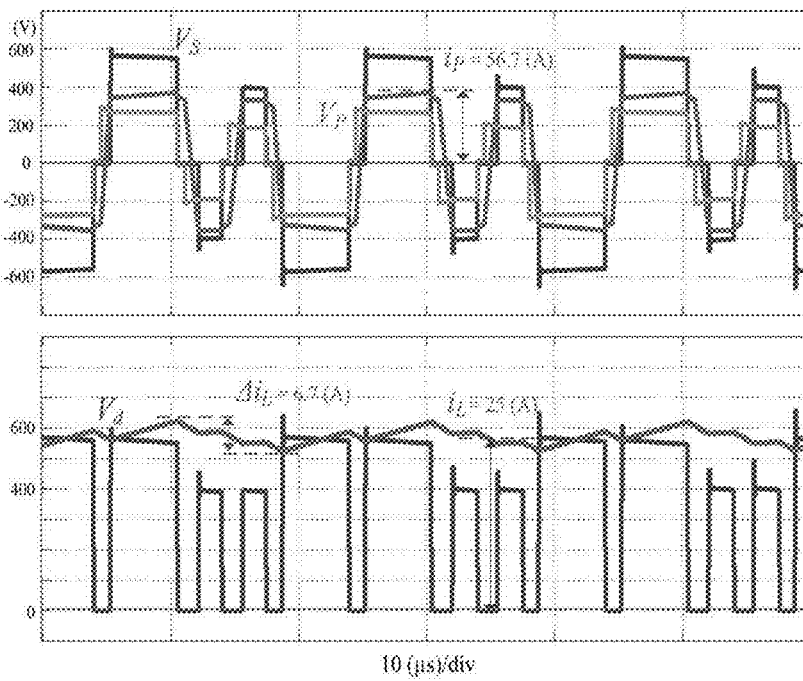
Fig. 8B: PWM of Vlatković et al.

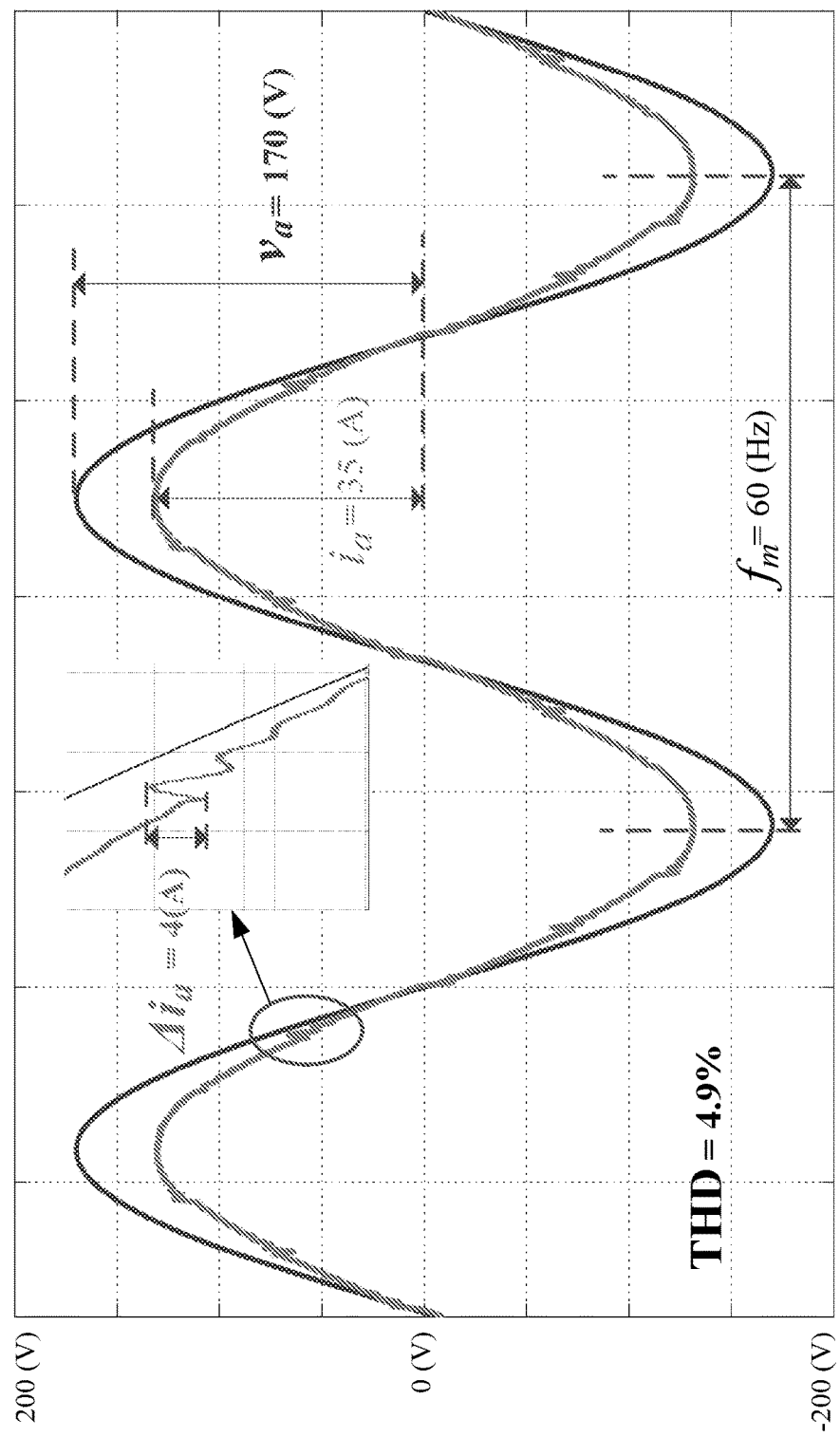
Fig. 8C: Grid side phase voltage and current

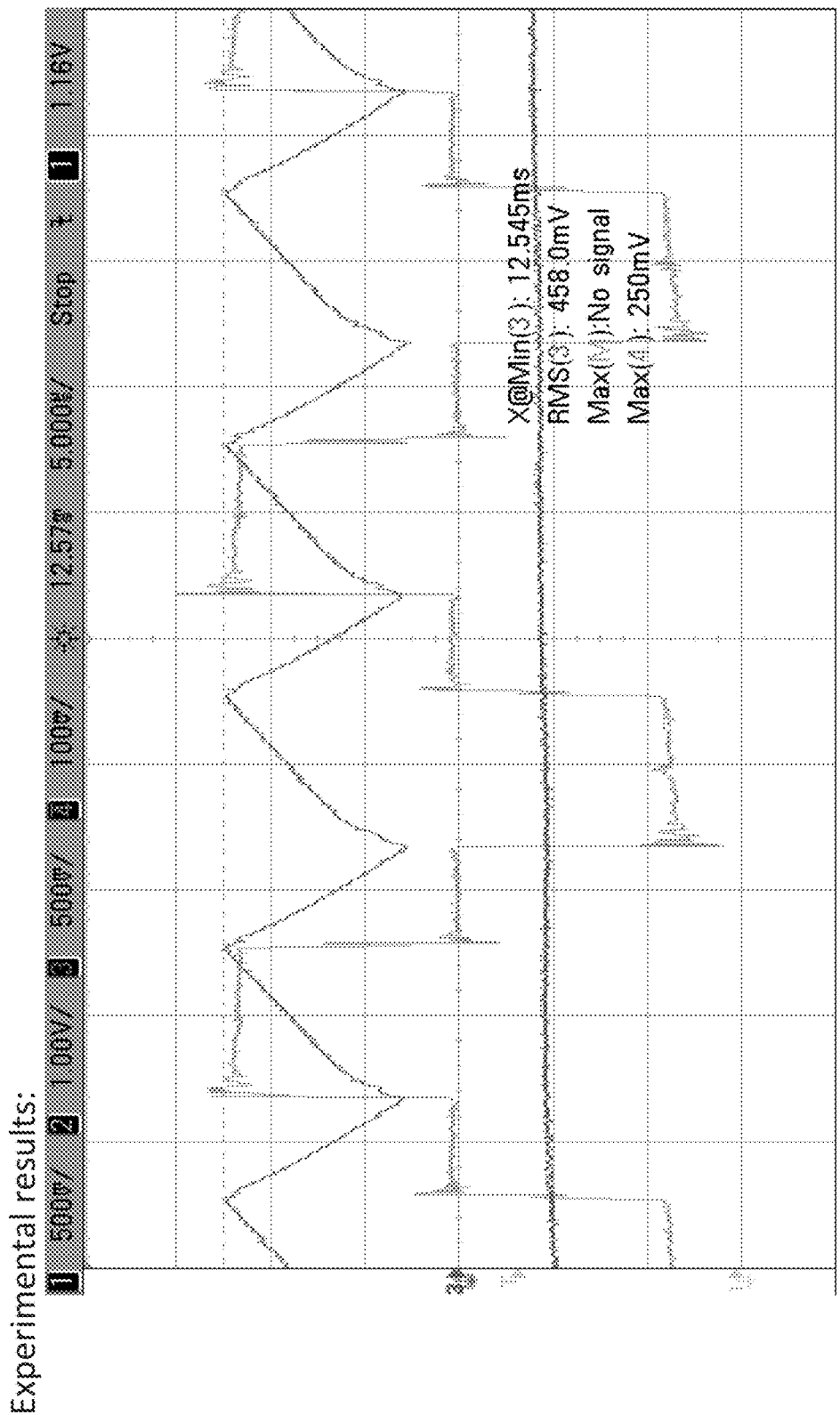
Fig. 9A: inductor output current and transformer primary voltage at θ = 0

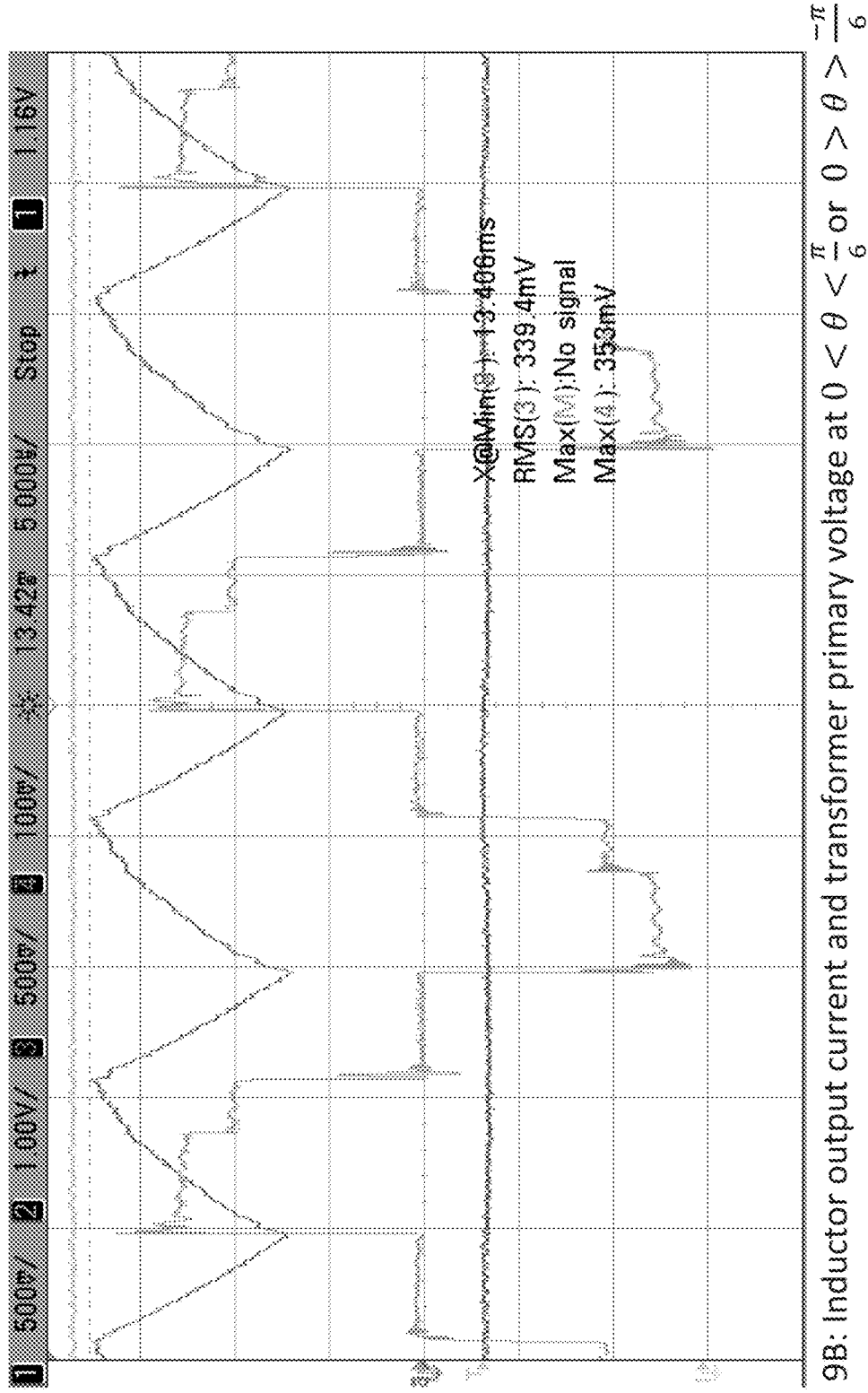
Fig. 9B: Inductor output current and transformer primary voltage at $0 < \theta < \frac{\pi}{6}$ or $0 > \theta > -\frac{\pi}{6}$

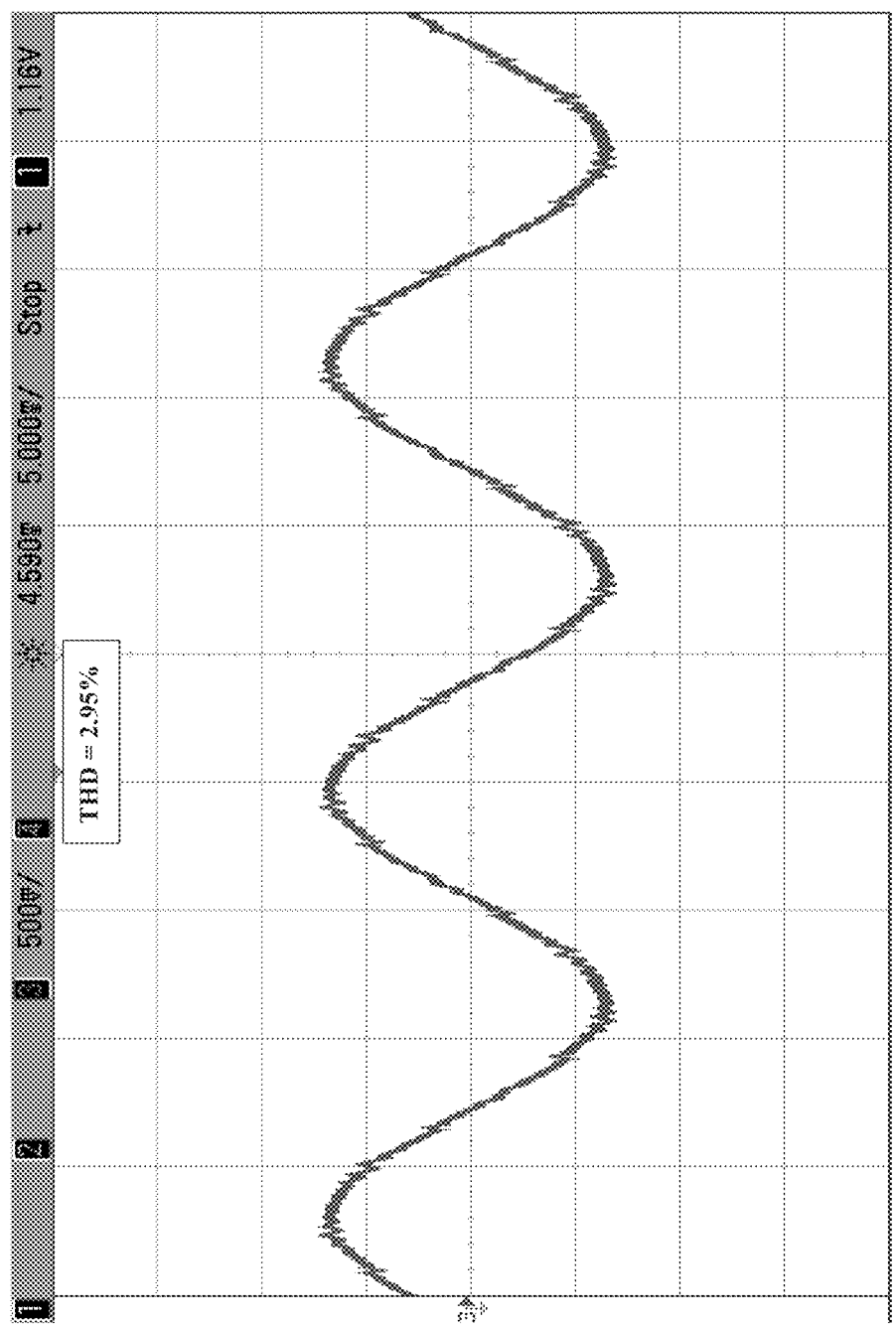
Fig. 10: total harmonic distortion of input grid current at 15% load.

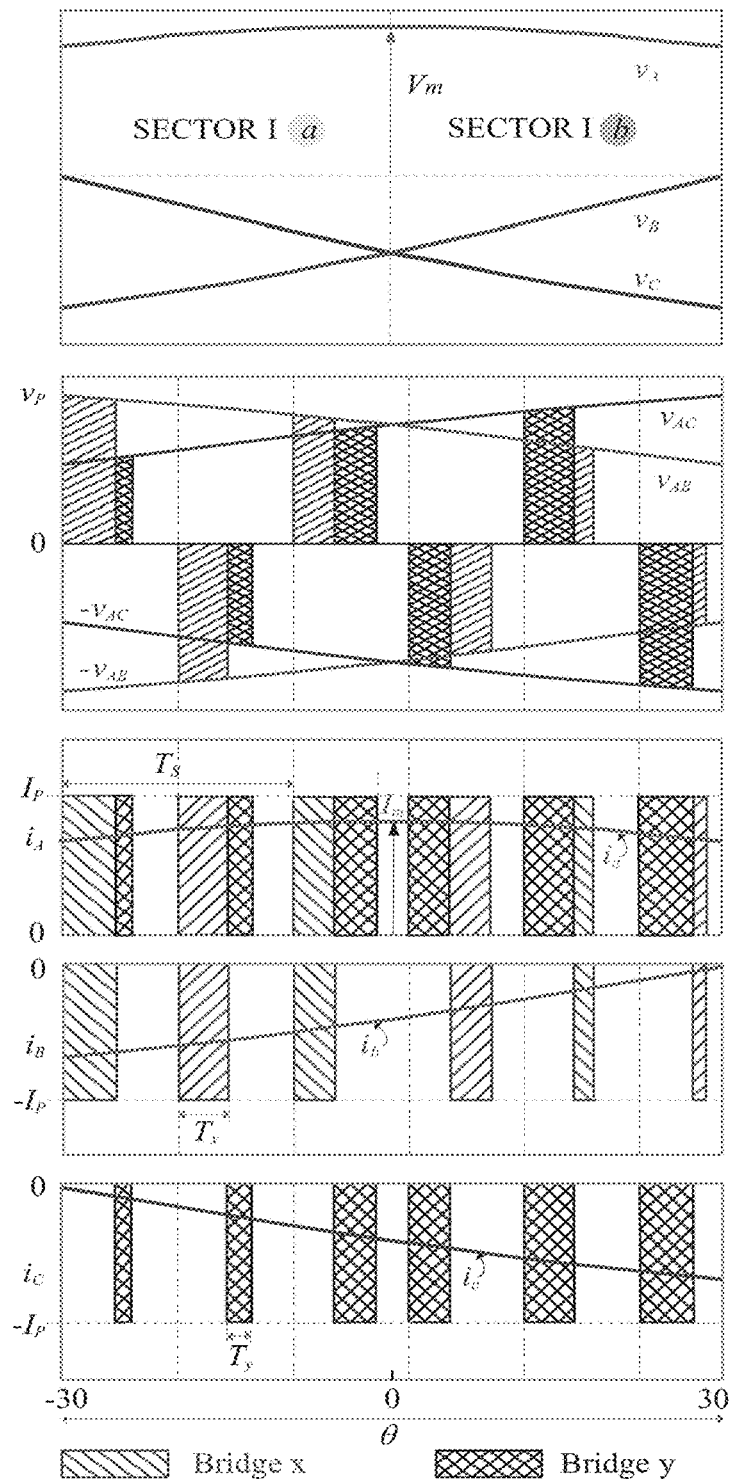
Fig. 11: PWM waveforms with increased switching period $T_S$.

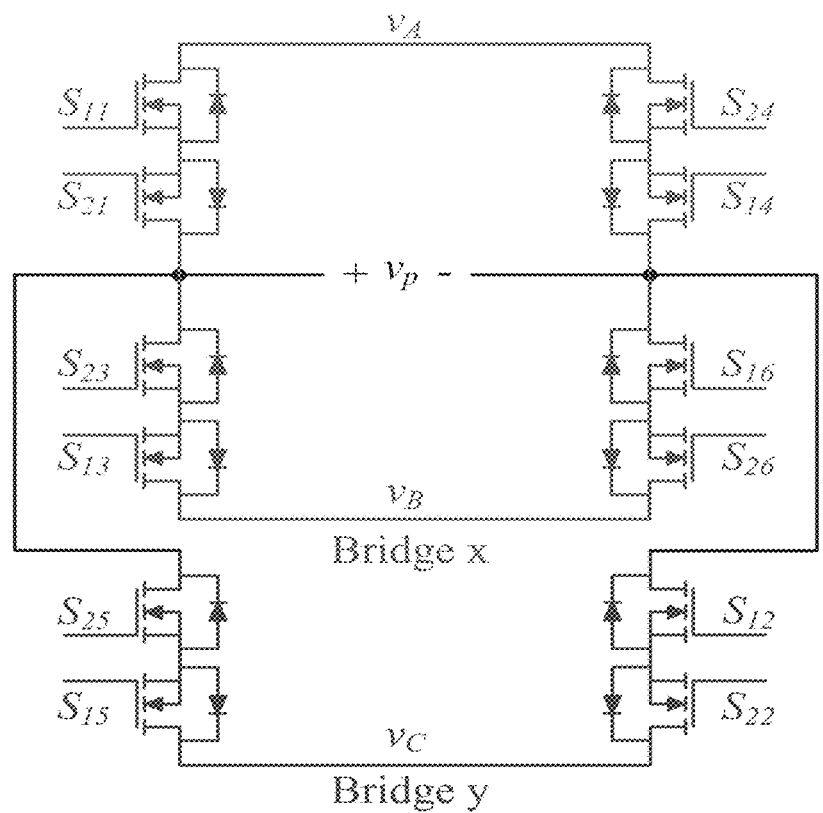
Fig. 12: Three-phase converter redrawn as full bridge DC-DC converter with Bridges x and y.

ZVS transition in different operating modes
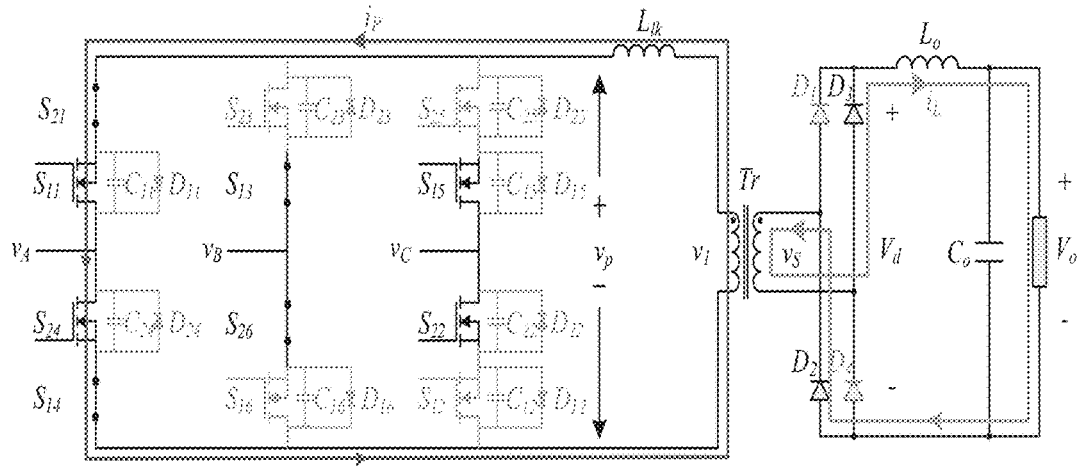
Fig. 13: Mode 0: [$t_0^-$]
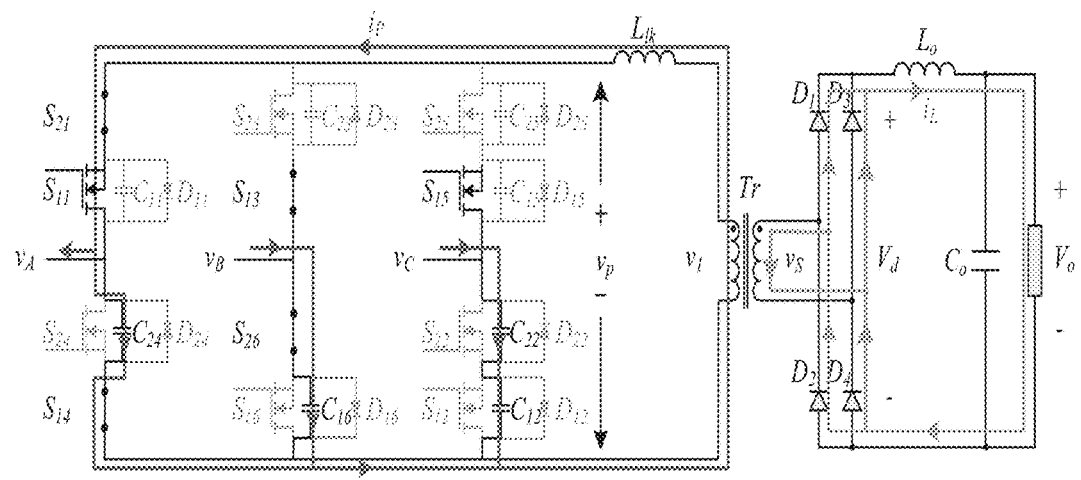
Fig. 14: Mode 1: t = [$t_0, t_1$]

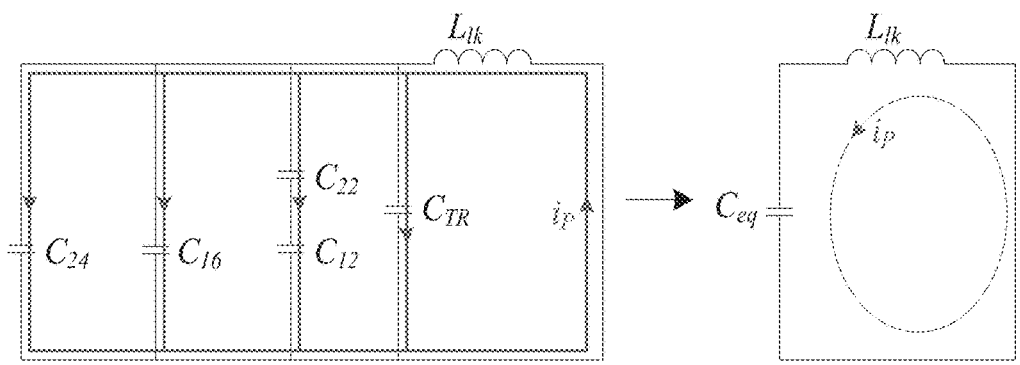
Fig. 15: Equivalent circuit of Mode 1.

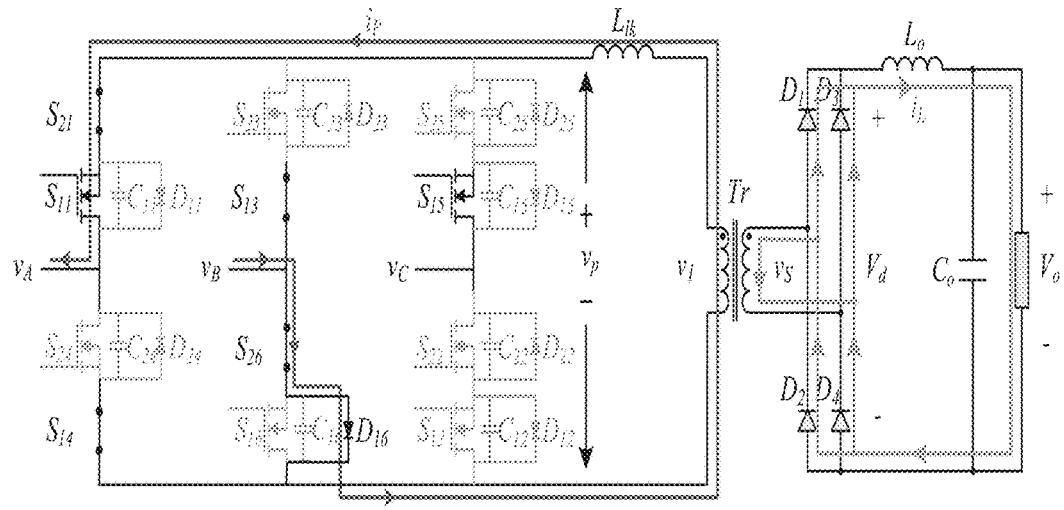
t = [t₁, t₂]
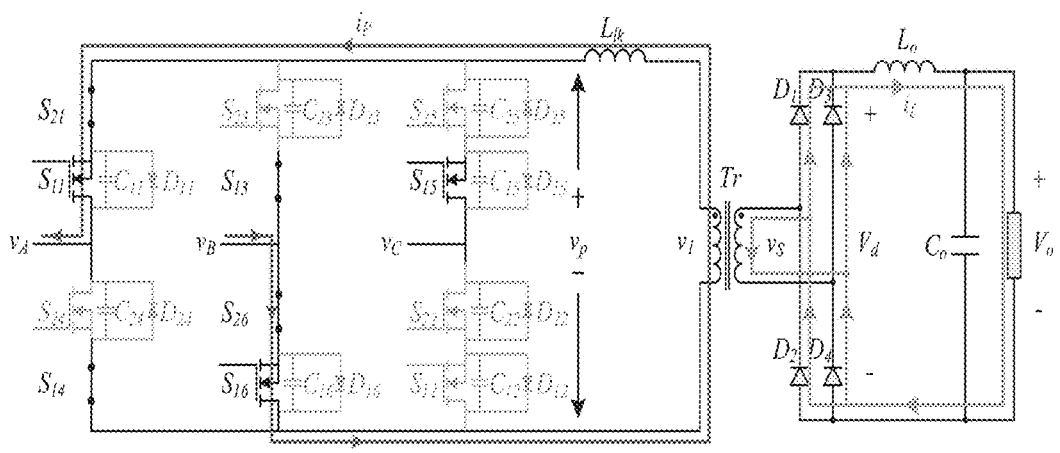
t = [t₂, t₃]
Fig. 16: Mode 2: t = [t₁, t₂] and t = [t₂, t₃].

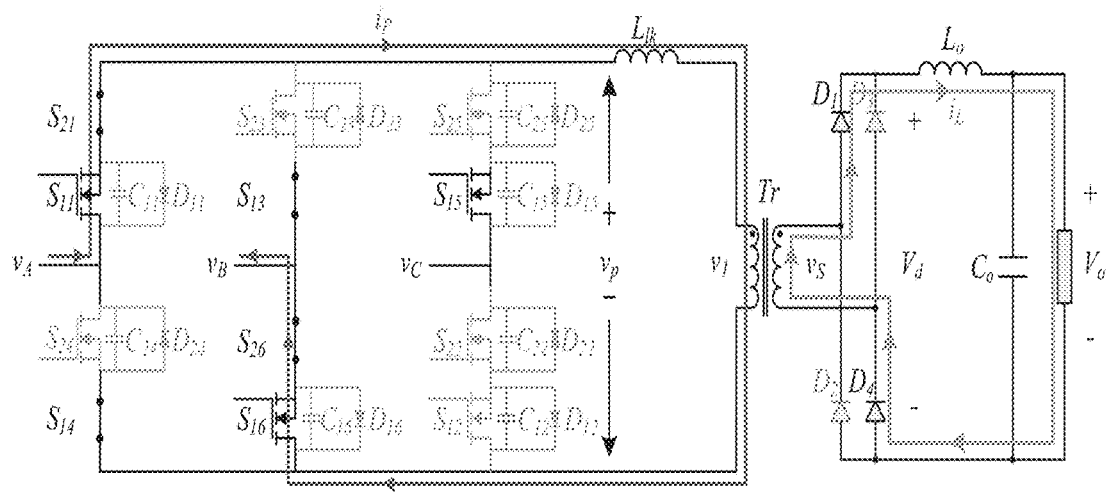
t = [t₃, t₄]
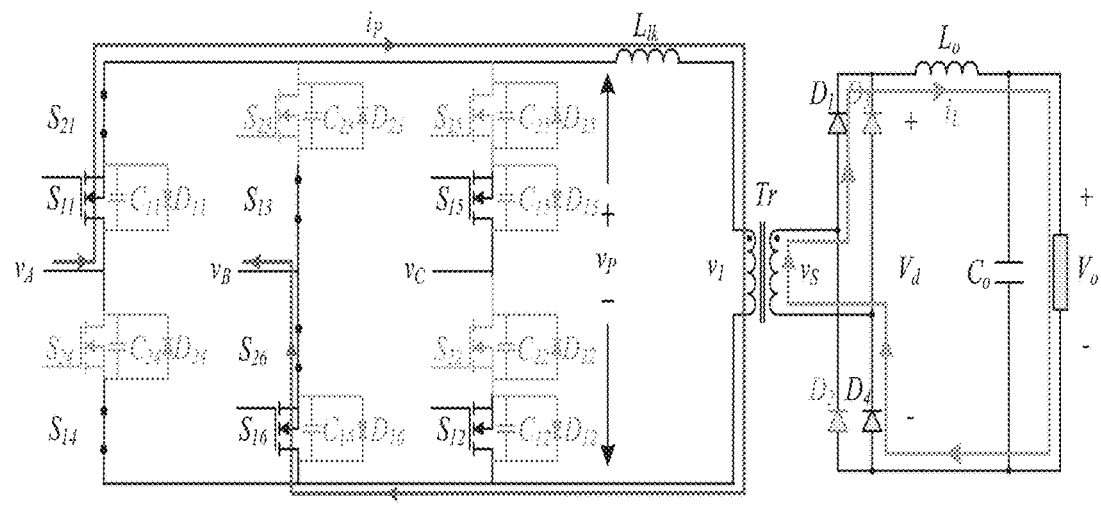
t = [t₄, t₅]
Fig. 17: Mode 3: t = [t₃, t₄] and t = [t₄, t₅].

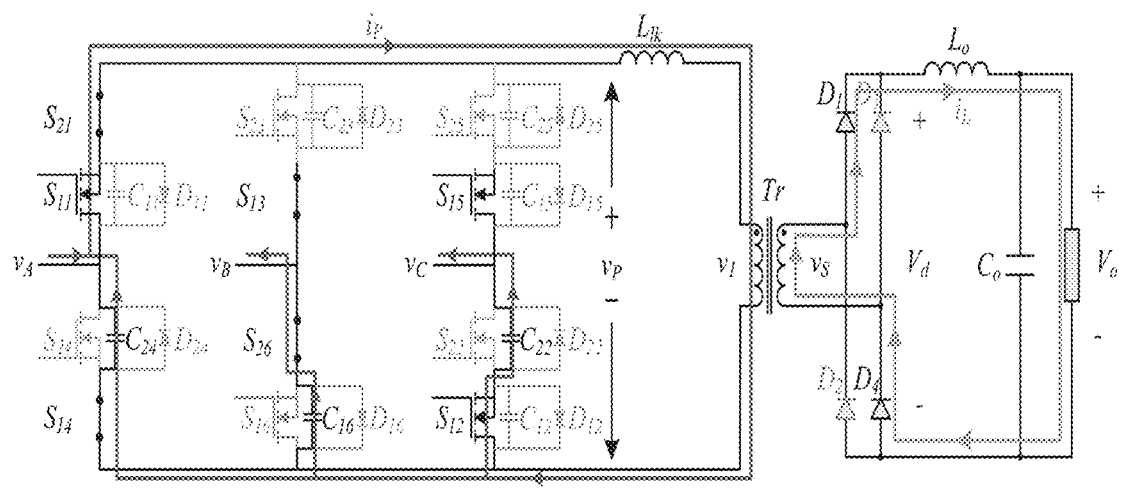
Fig. 18: Mode 4: t = [t₅, t₆].

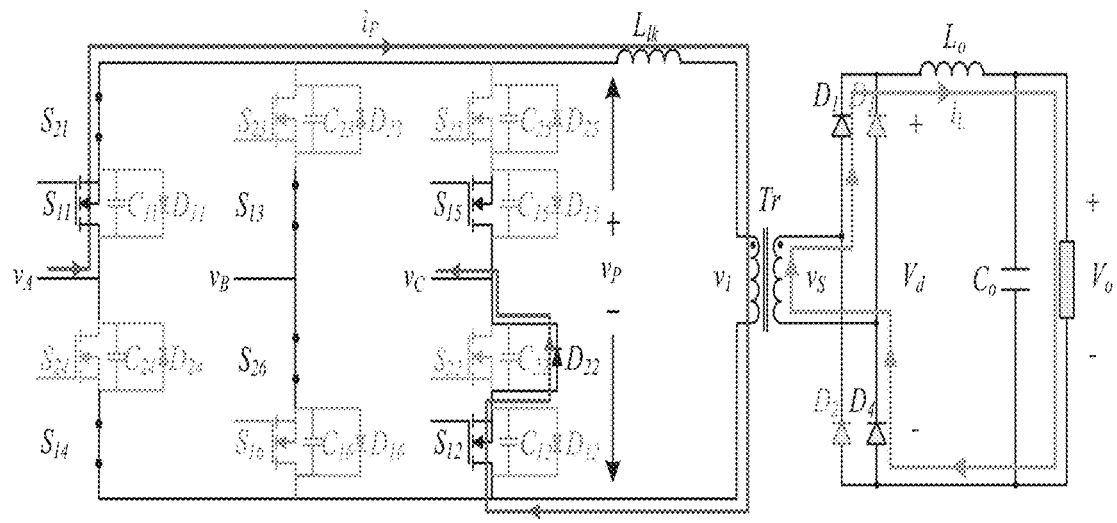
t = [t_6, t_7]
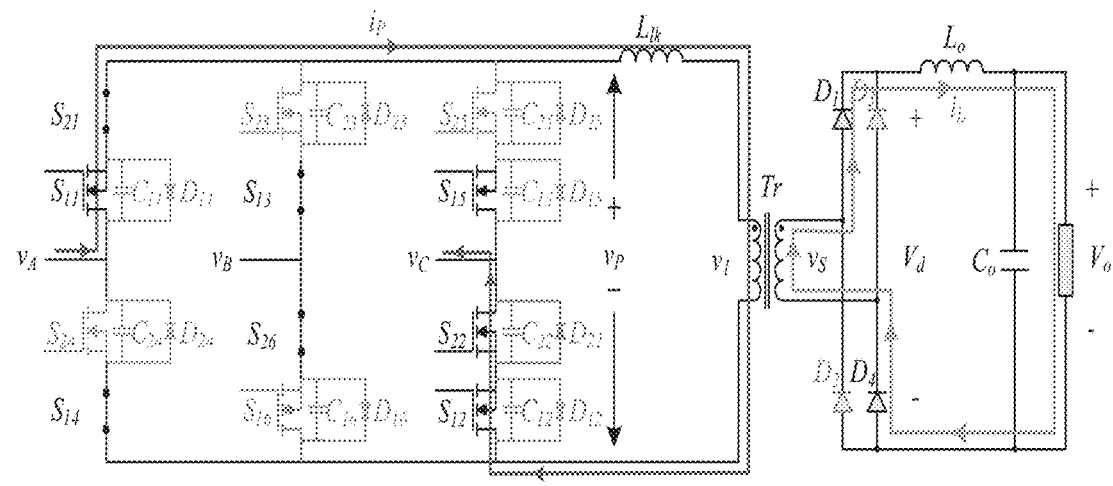
t = [t_7, t_8]
Fig. 19: Mode 5: t = [t_6, t_7] and t = [t_7, t_8]

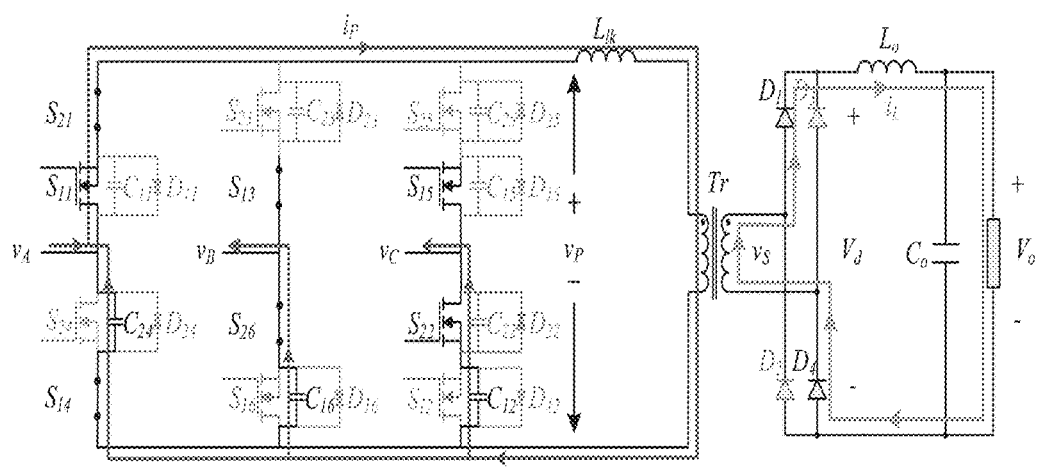
Fig. 20: Mode 6: t = [t₈, t₉]

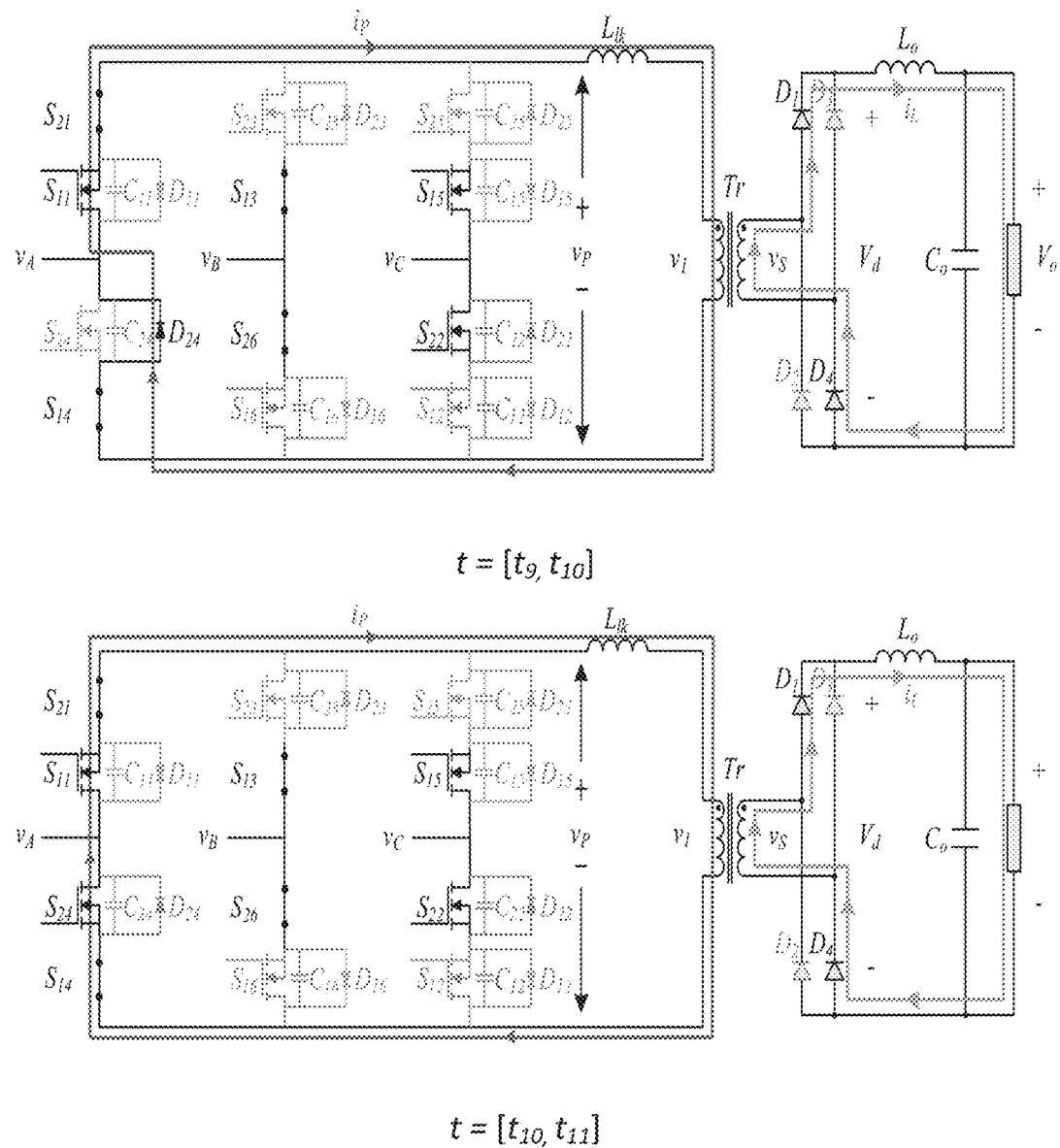
Fig. 21: Mode 7: t = [t₉, t₁₀] and t = [t₁₀, t₁₁]

PWM SCHEME BASED ON SPACE VECTOR MODULATION FOR THREE-PHASE RECTIFIER CONVERTERS

BACKGROUND OF THE INVENTION

1. Field of the Invention

The present invention relates to pulse-width modulation (PWM) schemes based on space vector modulation (SVM) for three-phase rectifier converters.

2. Description of the Related Art

When reduction of size and weight of a converter is desired, the electrical isolation should be performed at high-frequency. Typically, single-stage power conversion can be realized with a direct matrix-type power factor correction (PFC) rectifier that directly converts the mains-frequency AC voltage into a high-frequency AC voltage which is supplied to a high-frequency isolation transformer and whose secondary voltage is then rectified to the desired DC output voltage.

FIG. 1 shows a three-phase, single-stage, isolated, high-frequency, PWM matrix rectifier. The circuit shown in FIG. 1 can be used either with known PWM schemes discussed in this section or with the novel PWM schemes according to the preferred embodiments of the present invention discussed in the Detailed Description of Preferred Embodiments section below.

FIG. 1 shows an isolated matrix rectifier. In the description of FIG. 1, "line side," "grid side," and "primary side" refer to the portion of the circuit on the left-hand side of the transformer $T_r$ that is connected to the line voltages $v_a$, $v_b$, $v_c$ for each of the phases A, B, C, and "load side" and "secondary side" refer to the portion of the circuit on the right-hand side of the transformer $T_r$ that is connected to the output voltage $V_o$, i.e., the load. On the line side, the three-phase AC current is combined into a single-phase AC current, and on the load side, the single-phase AC current is rectified by diodes $D_1$ to $D_4$ to provide a DC current.

The isolated matrix rectifier of FIG. 1 includes a filter inductor $L_f$ and a filter capacitor $C_f$ that define a line-side filter that reduces the total harmonic distortion (THD), bi-directional switches $S_1$ to $S_6$ arranged in a bridge as a 3-phase-to-1-phase matrix converter, a transformer $T_r$ that provides high-voltage isolation between the line-side circuit and the load-side circuit, four diodes $D_1$ to $D_4$ arranged in a bridge to provide output rectification, an output inductor $L_o$ and an output capacitor $C_o$ that define a filter for the output voltage.

Bi-directional switches are used in this isolated matrix rectifier to open or close the current path in either direction. As shown in FIG. 1, the bi-directional switch includes two metal-oxide-semiconductor field-effect transistors (MOSFETs) connected in series. Because of the antiparallel diode of the MOSFETs, the MOSFET can only turn off the current in one direction. With two MOSFETs connected source-to-source or drain-to-drain, bi-directional switching can be achieved. If insulated gate bipolar transistors (IGBTs) are used, the two IGBTs can be connected in parallel or series to define the bi-directional switch.

A known three-phase, single-stage, isolated high-frequency PWM rectifier as shown in FIG. 1 is disclosed in Vlatković et al., "A Zero-Voltage Switched, Three-phase Isolated PWM Buck Rectifier," IEEE Trans. Power Electron., Vol. 10, No. 2, March 1995, pp. 148-157. The PWM rectifier shown in FIG. 1 is capable of power factor correction (unity power factor), low harmonic current distortion, and realizing zero-voltage switching (ZVS) for all power semiconductor devices. The capacitors $C_{21}$ and $C_{11}$ in FIG. 1 are parasitic capacitors that can be used in ZVS. The known converter of Vlatković et al. uses two full-bridge phase-shifted (FB-PS) converter sub-topologies, phases A and B define "converter x" (which can also be referred to as bridge x) and phases A and C define "converter y" (which can also be referred to as bridge y). Converters x and y operate alternatively within the switching cycle. Each converter has a series inductor that reduces the effective duty ratio and extended commutation time, resulting in larger current ripple and larger output inductor. The aforementioned duty cycle loss limits the converter operation at higher switching frequency, which results in decreased conversion efficiency and power density. When a large leakage inductance is required for extending ZVS at light load, the known PWM scheme of Vlatković et al. produces a larger THD compared to the PWM scheme of the preferred embodiments of the present invention.

SUMMARY OF THE INVENTION

To overcome the problems described above, preferred embodiments of the present invention provide PWM schemes in which duty losses are significantly reduced (which prevents the reduction of the effective duty cycle), efficiency is improved during light load, the peak output inductor current ripple is significantly reduced, and the total THD in the line-side current is significantly reduced.

A preferred embodiment of the present invention provides a method of operating a matrix rectifier. The matrix rectifier includes input phases A, B, and C, each of the input phases A, B, and C includes two bi-directional switches connected in series; a transformer connected to the input phases A, B, and C; a rectifier bridge connected to the transformer; a bridge x defined by phases A and B; and a bridge y defined by phases A and C. The method of operating the matrix converter includes operating the bridges x and y as independent full-bridge phase-shifted converters in each 60° interval between two successive zero-voltage crossings of the input phases A, B, and C. In a first 30° sector of each 60° interval, the bridges x and y are operated in a first vector sequence in every switching period where each vector represents a switch state of the bi-directional switches; and the first vector sequence is divided into a sequence of $\vec{I}_{x+}$, $\vec{I}_{y+}$, $\vec{I}_0$, $\vec{I}_{x-}$, $\vec{I}_{y-}$, $\vec{I}_0$, where $\vec{I}_{x+}$ and $\vec{I}_{x-}$ represent switching states of vector $\vec{I}_x$ for bridge x when $i_P>0$ and $i_P<0$, respectively, and where $\vec{I}_{y+}$ and $\vec{I}_{y-}$ represent switching states of vector $\vec{I}_y$ for bridge y when $i_P>0$ and $i_P<0$, respectively.

A dwell time for each vector in the first vector sequence preferably is $T_x/2$, $T_y/2$, $T_0/2$, $T_x/2$, $T_y/2$, and $T_0/2$, respectively, where $T_x$, $T_y$, and $T_0$ are dwell times for $\vec{I}_x$, $\vec{I}_y$, and $\vec{I}_0$, respectively. Preferably, in a second 30° sector of each 60° interval, the bridges x and y are operated in a second vector sequence in every switching period, and the second vector sequence is divided into a sequence of $\vec{I}_{y+}$, $\vec{I}_{x+}$, $\vec{I}_0$, $\vec{I}_{y-}$, $\vec{I}_{x-}$, $\vec{I}_0$. A dwell time for each vector in the second vector sequence preferably is $T_y/2$, $T_x/2$, $T_0/2$, $T_y/2$, $T_x/2$, and $T_0/2$, respectively. Unity power factor and output-voltage regulation preferably are simultaneously achieved.

A preferred embodiment of the present invention provides a matrix rectifier including input phases A, B, and C, each of the input phases A, B, and C includes two bi-directional switches connected in series; a transformer connected to the input phases A, B, and C; a rectifier bridge connected to the transformer; a bridge x defined by the phases A and B; a bridge y defined by the phases A and C; and a controller that operates the bridges x and y as independent full-bridge phase-shifted converters in each 60° interval between two successive zero-voltage crossings of the input phases A, B, and C. In a first 30° sector of each 60° interval, the controller operates the bridges x and y in a first vector sequence in every switching period where each vector represents a switch state of the bi-directional switches, and the first vector sequence is divided into a sequence of $\vec{I}_{x+}$, $\vec{I}_{y+}$, $\vec{I}_0$, $\vec{I}_{x-}$, $\vec{I}_{y-}$, $\vec{I}_0$, where $\vec{I}_{x+}$ and $\vec{I}_{x-}$ represent switching states of vector $\vec{I}_x$ for the bridge x when $i_P>0$ and $i_P<0$, respectively, and where $\vec{I}_{y+}$ and $\vec{I}_{y-}$ represent switching states of vector $\vec{I}_y$ for the bridge y when $i_P>0$ and $i_P<0$, respectively. A dwell time for each vector in the first vector sequence preferably is $T_x/2$, $T_y/2$, $T_0/2$, $T_x/2$, $T_y/2$, and $T_0/2$, respectively, where $T_x$, $T_y$, and $T_0$ are dwell times for $\vec{I}_x$, $\vec{I}_y$, and $\vec{I}_0$, respectively. Preferably, in a second 30° sector of each 60° interval, the controller operates the bridges x and y in a second vector sequence in every switching period, and the second vector sequence is divided into a sequence of $\vec{I}_{y+}$, $\vec{I}_{x+}$, $\vec{I}_0$, $\vec{I}_{y-}$, $\vec{I}_{x-}$, $\vec{I}_0$. The dwell time for each vector in the second vector sequence is $T_y/2$, $T_x/2$, $T_0/2$, $T_y/2$, $T_x/2$, and $T_0/2$, respectively. Unity power factor and output-voltage regulation preferably are simultaneously achieved.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 1 shows an isolated matrix rectifier.
FIGS. 2A and 2B show current space vector representations.
FIG. 2C shows the envelope of the transformer primary voltage.
FIG. 3 shows the synthesis of reference current $\vec{I}_{ref}$ by $\vec{I}_1$, $\vec{I}_2$, and, $\vec{I}_0$.
FIGS. 4A and 4B show various circuit waveforms.
FIGS. 5A and 5B show a comparison of duty cycle losses.
FIGS. 6A and 6B show envelopes of the output-inductor current ripple.
FIGS. 7A and 7B are close up views of the maximum current ripple of the current envelope of FIGS. 6A and 6B.
FIGS. 8A and 8B show simulations of a PWM scheme of a preferred embodiment of the present invention and a known PWM scheme.
FIG. 8C shows simulated line-side phase voltage and current of the matrix rectifier of FIG. 1.
FIGS. 9A and 9B show inductor output current and transformer primary voltage.
FIG. 10 shows the total harmonic distortion at 15% load.

FIG. 11 shows PWM waveforms of the matrix rectifier of FIG. 1.
FIG. 12 shows bridges x and y of the matrix rectifier of FIG. 1.
FIGS. 13-21 show different operational modes of the matrix rectifier of FIG. 1.

DETAILED DESCRIPTION OF PREFERRED EMBODIMENTS

The methods of the preferred embodiments of the present invention can be used with the matrix rectifier shown in FIG. 1. Within any 60° interval, the matrix rectifier can be considered, as shown in FIG. 12, as two full-bridge phase-shifted (FB-PS) converter sub-topologies, in which phases (sometimes referred to as legs) A and B define "bridge x" and phases A and C define "bridge y," which operate alternatively within one switching cycle. Bridges x and y act as two independent FB-PS converters. During one switching cycle of the three-phase matrix rectifier, there are two sub-switching cycles for each bridge x and y, respectively, and each bridge x or y completes one operating cycle in the same manner as a FB-PS converter. Therefore, steady-state operation and ZVS analysis of the three-phase converter is done in the same way as the FB-PS converter.

By rearranging the operating sequence of bridges x and y, a different PWM scheme can be generated. This different PWM scheme according to the preferred embodiments of the present invention combines the operation of bridge x and bridge y to resemble the operation of one FB-PS converter. During one switching cycle of the three-phase matrix rectifier, bridges x and y work together to complete one operating cycle in a similar way as a FB-PS converter. The operation of the basic soft-switching FB-PS converter is known. Therefore, only the operation modes during the switch transitions in the three-phase matrix rectifier will be described. The SVM technique and PWM scheme can be used to simultaneously achieve unity power factor and output-voltage regulation.

1) Principle of Operation

Within any 60° interval between two successive zero crossings of the three-phase voltage input, there are two line voltages that do not change sign, i.e., do not change from positive to negative and do not change from negative to positive. For example, in FIG. 11, in the interval of $-30° \leq \theta \leq 30°$, the line voltages $v_{AB}=v_A-v_B$ and $v_{AC}=v_A-v_C$ are positive, and the line voltage $v_{AB}$, $v_{AC}$ both attain their maximum in this interval. Because the switching frequency of the matrix rectifier is much higher than the line frequency, the two line voltages $v_{AB}$, $v_{AC}$ can be considered as slowly varying DC voltages. Therefore, the three-phase matrix rectifier can be redrawn as one full-bridge converter with two bridges, bridge x and bridge y, as shown in FIG. 12. In FIG. 1, the combination of phases A and B define bridge x, and the combination of phases A and C define bridge y. FIG. 11 shows the principal waveforms within the interval $-30° \leq \theta \leq 30°$. With an excessively increased switching period in which the switching frequency is reduced to a very low value, the details of the PWM can be observed as shown in FIG. 11.

In sector I(a), in which $-30° \leq \theta \leq 0°$ and $v_{AB}>v_{AC}$, the switches $S_{11}$, $S_{21}$ and $S_{16}$, $S_{26}$ of bridge x are turned on with an on-time $T_x$, creating a positive voltage pulse $v_P=v_{AB}$ and a current pulse flowing from phase A into phase B with magnitude of $I_P$. Then switches $S_{11}$, $S_{21}$ and $S_{12}$, $S_{22}$ of bridge y turn on with an on-time $T_y$, creating a positive voltage pulse $v_P=v_{AC}$ and a current pulse flowing from phase A into phase C with magnitude of $I_P$.

To keep the transformer flux balanced, a negative voltage pulse of the same duration is generated next by turning on switches $S_{14}$, $S_{24}$ and $S_{13}$, $S_{23}$ of bridge x and switches $S_{14}$, $S_{24}$ and $S_{15}$, $S_{25}$ of bridge y. The line-side current remains the same regardless of the alternating transformer current. In sector I(b), in which θ satisfies 0°≤θ≤30° and $v_{AC}>v_{AB}$, the sequence to turn on bridges x and y is reversed to achieve ZVS operation of the switches $S_{14}$, $S_{24}$, $S_{13}$, $S_{23}$, $S_{15}$, and $S_{25}$, as discussed below.

Assuming that the matrix rectifier's output current is constant during one switching cycle, the relationship between the primary current $i_P(t)$ and the output-inductor current $i_L(t)$ is given by:

$$i_P = \begin{cases} I_P = nI_L, & V_P > 0 \\ -I_P = -nI_L, & V_P < 0 \end{cases} \quad (1)$$

The phase currents can be synthesized by current pulses of constant magnitude. If the input phase currents are given by $$\begin{bmatrix} i_a(\theta) \\ i_b(\theta) \\ i_c(\theta) \end{bmatrix} = I_m \begin{bmatrix} \cos(\theta) \\ \cos\left(\theta - \frac{3\pi}{2}\right) \\ \cos\left(\theta + \frac{3\pi}{2}\right) \end{bmatrix} \quad (2)$$

the duty cycle $$\frac{T_x}{T_S} \text{ and } \frac{T_y}{T_S},$$

of the input current pulses generated by bridges x and y, respectively, within the chosen 60° interval are $$\begin{bmatrix} \frac{T_x}{T_S} \\ \frac{T_y}{T_S} \\ \frac{T_x+T_y}{T_S} \end{bmatrix} = \begin{bmatrix} \frac{-i_b(\theta)}{I_P} \\ \frac{-i_c(\theta)}{I_P} \\ \frac{i_a(\theta)}{I_P} \end{bmatrix} = m_a \begin{bmatrix} \frac{-i_b(\theta)}{I_m} \\ \frac{-i_c(\theta)}{I_m} \\ \frac{i_a(\theta)}{I_m} \end{bmatrix} \quad (3)$$

where $I_m$ is the peak of the fundamental-frequency component in $i_a$ and $$m_a = \frac{I_m}{I_P}$$

is the modulation index.

2) Switching States and Space Vectors of PWM Scheme

The matrix rectifier in FIG. 1 is equivalent to a traditional current-source rectifier (CSR), except that all the switches are bidirectional. An SVM technique and PWM scheme can be used to simultaneously achieve unity power factor at the input and output-voltage regulation.

As explained in U.S. Application No. 62/069,815, "SPACE VECTOR MODULATION FOR MATRIX CON-VERTER AND CURRENT SOURCE CONVERTER," filed on Oct. 28, 2014, the entire contents of which are hereby incorporated herein by reference, and in PCT Application No. PCT/US2015/057887, "SPACE VECTOR MODULATION FOR MATRIX CONVERTER AND CURRENT SOURCE CONVERTER," filed on Oct. 28, 2015, the entire contents of which are hereby incorporated herein by reference, the SVM technique is based on the representation of the required instantaneous input current vector in the complex plane $\vec{I}(t)=I_m(t)e^{j\omega t}$. The input current space vector of the converter is defined as:

$$\vec{I}(t)=\tfrac{2}{3}[i_a(t)e^{j0}+i_b(t)e^{j2\pi/3}+i_c(t)e^{j4\pi/3}] \quad (4)$$

As shown in the FIGS. 2A and 2B, the active switching states can be represented by active vectors $\vec{I}_1$ to $\vec{I}_6$, and zero switching states can be represented by zero space vectors $\vec{I}_7$, $\vec{I}_8$, and $\vec{I}_9$.

For each active vector, there are two possible switching states depending on the direction of the primary current $i_P$ as shown in FIGS. 2A and 2B.

Based on different switching states, the six active vectors can be obtained by equation (2):

$$\vec{I}_n = \frac{2}{\sqrt{3}} I_P e^{j\left(\frac{n\pi}{3} - \frac{\pi}{2}\right)} \quad (5)$$

where n=1, 2, . . . , 6 for sectors I, II, . . . , VI, respectively.

The reference vector $\vec{I}_{ref}$ rotates in space at an angular velocity that is the same as the grid voltage vector to obtain a sinusoidal input current shape. Unity power factor can be achieved by aligning the reference vector $\vec{I}_{ref}$ with the grid voltage vector. The reference vector $\vec{I}_{ref}$ can be approximated by two adjacent active vectors $\vec{I}_x$, $\vec{I}_y$ and a zero vector $\vec{I}_0$ as shown in FIG. 3. $\vec{I}_x$ is generated by bridge x, and $\vec{I}_y$ is generated by bridge y. For example, when the reference vector $\vec{I}_{ref}$ is in sector I as shown in FIG. 3, it can be synthesized by $\vec{I}_x=\vec{I}_1$, $\vec{I}_y=\vec{I}_2$ and $\vec{I}_0$.

3) Dwell Time Calculation

Below, the analysis is done in sector I which includes the vectors $\vec{I}_1$ and $\vec{I}_2$. If the output-inductor current $I_L$ is assumed to be constant, the ampere-second balancing equation is given by:

$$\vec{I}_{ref}T_s=\vec{I}_1 T_1+\vec{I}_2 T_2+\vec{I}_0 T_0 \quad (6)$$

where $T_1$, $T_2$, and $T_0$ are the dwell times for the vectors $\vec{I}_1$, $\vec{I}_2$, and $\vec{I}_0$, respectively. The dwell time for $\vec{I}_1$, $\vec{I}_2$, and $\vec{I}_0$ can be calculated using the following equations:

$$T_x = T_1 = m_a T_s \sin\left(\frac{\pi}{6} - \theta\right) \quad (7)$$
$$T_y = T_2 = m_a T_s \sin\left(\frac{\pi}{6} + \theta\right) \text{ for } -\frac{\pi}{6} \le \theta < \frac{\pi}{6}$$
$$T_0 = T_S - T_x - T_y$$

where $m_a$ is the modulation index, given by the following equation:

$$m_a = \frac{1}{n} \frac{I_{ref}}{I_L} = \frac{I_m}{I_P} \quad (8)$$

$$0 \leq m_a \leq 1$$

where $I_m$ is the peak of the fundamental-frequency component in phase A current $i_a$.

4) SVM Switching Sequence

To use the transformer isolation, the primary voltage $v_P$ of transformer $T_r$ in FIG. 1 must alternate with a high frequency between positive and negative to maintain volt-sec balance. The vector sequence in every switching period can be divided into the sequence of $\vec{I}_{x+}, \vec{I}_{y+}, \vec{I}_0, \vec{I}_{x-}, \vec{I}_{y-}, \vec{I}_0$, where $\vec{I}_{x+}$ and $\vec{I}_{x-}$ represent the switching states of vector Ix when $i_P>0$ and $i_P<0$, respectively, and $\vec{I}_{y+}$ and $\vec{I}_{y-}$ represent switching states of vector $\vec{I}_y$ when $i_P>0$ and $i_P<0$, respectively. Then the dwell time for each vector will be $T_x/2, T_y/2, T_0/2, T_x/2, T_y/2$, and $T_0/2$, respectively. As shown in FIGS. 2A and 2B, the two space-vector representations are different when the primary current $i_P$ changes direction. During each switching period $T_S$, the switching states are selected alternatively from these two space vector diagrams to generate alternating primary voltage $v_P$ and to maintain the same phase current as the line side.

Each sector is divided into two sections a and b. For $$\theta \in \left[-\frac{\pi}{6}, 0\right],$$

the reference vector $\vec{I}_{ref}$ is located in sector I(a), and for $$\theta \in \left[0, \frac{\pi}{6}\right],$$

the reference vector $\vec{I}_{ref}$ is located in sector I(b). The vector sequence discussed above is for sector I(a) only. In sector I(b), the sequence of two active vectors is reversed to achieve ZVS during the transition from one active vector to another active vector. Then, the vector sequence in sector I(b) becomes $\vec{I}_{y+}, \vec{I}_{x+}, \vec{I}_0, \vec{I}_{y-}, \vec{I}_{x-}, \vec{I}_0$ with the dwell time of each vector $T_y/2, T_x/2, T_0/2, T_y/2, T_x/2$, and $T_0/2$, respectively.

5) Steady-State Operation

The analysis below is based on the assumptions that the forward voltage drop across the diodes and the MOSFETs is zero, that the rectifier diode capacitances are zero, and that the output voltage Vo is constant.

The complete operation of the three-phase converter during one switching period $T_s$ is illustrated in FIGS. 4A and 4B. The circuit waveforms shown in FIGS. 4A and 4B include the primary voltage $v_P$, the primary current $i_P$, the rectified secondary voltage $V_d$, the output-inductor current $i_L$, and the corresponding switch gate signals in sectors I(a) and I(b). In sector I(a) for $$\theta \in \left[-\frac{\pi}{6}, 0\right],$$

the voltage $v_{AB}$ is greater than the voltage $v_{AC}$, and in sector I(b) for $$\theta \in \left[0, \frac{\pi}{6}\right],$$

the voltage $v_{AC}$ is greater than the voltage $v_{AB}$. As shown in FIGS. 4A and 4B, the duty loss (during the interval $\Delta D$) caused by the leakage inductance can be observed when the primary current $i_P$ change directions. The duty loss can cause distortion on the line-side current because the effective dwell time will be less than the calculated value.

The transition time from the zero vectors to the active vectors is finite depending on the value of the leakage inductance $L_{lk}$ as shown in FIGS. 5A and 5B during the interval $\Delta D$. During this interval, the primary current $i_P$ changes from one direction to another direction, and there is no energy transfer from the line side to the load side. Therefore, the effective duty cycle which is the duty cycle of the transformer secondary-side rectifier voltage $v_d$ is less than the duty cycle of the primary voltage $v_P$.

In sector I as shown in FIG. 11, the voltage $v_A$ is always higher than voltages $V_B$ and $v_C$. Switches $S_{14}$ and $S_{21}$ can be kept on all the time because the body diodes of switches $S_{14}$ and $S_{21}$ are forward biased. During the interval $-30°\leq\theta\leq0°$, the voltage $v_B$ is the lower than the voltages $v_A$ and $v_C$, the body diodes of switches $S_{13}$ and $S_{26}$ of bridge x are forward biased, and the switches $S_{13}$ and $S_{26}$ can be kept on during the entire interval as shown in FIG. 4A. Constraints need to be applied to switches $S_{15}$ and $S_{22}$ of bridge y to prevent short circuit between the line voltages $V_B$ and $v_C$. In the left leg of bridges x and y as shown in FIG. 12, switch $S_{15}$ of bridge y should be complimentary to switch $S_{23}$ of bridge x to prevent short circuit between the line voltages $V_B$ and $v_C$ because the switch $S_{25}$ is forward biased because the voltage $v_C$ is higher than the voltage $V_B$. For the same reason, in the right leg of both bridges x and y, switch $S_{22}$ of bridge y should be complimentary to switch $S_{16}$ of bridge x because switch $S_{12}$ is forward biased.

During the interval $0°\leq\theta\leq30°$, voltage $v_C$ is lower than the voltages $v_A$ and $V_B$, the body diodes of switches $S_{15}$ and $S_{22}$ of bridge y are forward biased, and the switches $S_{15}$ and $S_{22}$ can be kept on during the entire interval as shown in FIG. 4B. Constraints need to be applied to switches $S_{13}$ and $S_{26}$ of bridge x for the same reason as constraints need to be applied to switches $S_{15}$ and $S_{22}$ in the interval $-30°\leq\theta\leq0°$ discussed above. Switch $S_{13}$ of bridge x should be complimentary to switch $S_{25}$ of bridge y, and switch $S_{26}$ of bridge x should be complimentary to switch $S_{12}$ of bridge y to prevent short circuit between the line voltages $V_B$ and $v_C$. The six switches $S_{21}, S_{14}, S_{13}, S_{26}, S_{15}, S_{22}$ discussed above function as synchronous rectifiers to bypass their body diodes because they are forward biased. The remaining six switches $S_{11}, S_{24}, S_{23}, S_{16}, S_{25}, S_{12}$ operate in a similar manner as FB-PS converter to achieve ZVS.

If the average phase currents ($i_a, i_b, i_c$) are sinusoidal and in phase with the phase voltages, the input phase voltages are given by $$\begin{bmatrix} v_a(\theta) \\ v_b(\theta) \\ v_c(\theta) \end{bmatrix} = V_m \begin{bmatrix} \cos(\theta) \\ \cos\left(\theta - \frac{3\pi}{2}\right) \\ \cos\left(\theta + \frac{3\pi}{2}\right) \end{bmatrix} \quad (9)$$

At steady state, the output voltage $V_o$ is the function of three phase input voltage $(v_a, v_b, v_c)$ and modulation index $m_a$. According to the principle of voltage-second balance, $$V_o T_S = n[(v_a - v_b)T_x + (v_a - v_c)T_y] \quad (10)$$

By substituting equations (7) and (9) into equation (10), provides:

$$V_o = \tfrac{3}{2} n m_a V_m. \quad (11)$$

During the interval $\Delta D$ of the duty loss, the primary current $i_P$ is increasing in a linear fashion from negative to positive or decreasing in a linear fashion from positive to negative. The total changes $I_{dx}$ is determined by the load current $I_o$. It is assumed that the output current ripple is small compared to the load current $I_o$, which is a realistic assumption at full load when the loss of duty cycle is at its most.

$$I_{dx} \approx 2nI_o \quad (12)$$

where $I_o$ is load current and n is transformer ratio. The total duty loss can be derived from the following equation:

$$\Delta D_{total} = \frac{4nI_O L_{lk}}{v_P(\theta) T_s} \quad (13)$$

where $v_P(\theta)$ is the voltage across the leakage inductance $L_{lk}$ during interval $\Delta D$ of duty loss. The voltage $v_P(\theta)$ is one of the three line-to-line voltages that has the highest magnitude depending on the angle $\theta$ as shown in FIG. 2C.

The maximum duty loss is obtained when $v_P(\theta)$ is a minimum at $\theta=0$ so that:

$$\Delta D_{total\_max} = \frac{8nI_O L_{lk}}{3V_m T_s} \quad (14)$$

where $V_m$ is the peak value of line-side phase voltage. Substituting equation (11) into equation (14), the maximum total duty loss is given by the following equation:

$$\Delta D_{total\_max} = \frac{4m_a n^2 L_{lk}}{RT_s}, \quad (15)$$

where $$R = \frac{V_o}{I_o}$$

is the load resistance.

The duty cycle loss can be reduced by using a smaller value of the leakage inductance $L_{lk}$, but at the price of a reduced load range to achieve ZVS. In the PWM scheme of the preferred embodiments of the present invention, the zero voltage transition happens twice in every cycle. Compared with the known PWM scheme of Vlatković et al., the duty cycle loss in the preferred embodiments is only approximately half of the duty loss of Vlatković et al. because the zero voltage transitions happened four times in Vlatković et al. In other words, if both designs have the same duty cycle loss, the PWM scheme of the preferred embodiments of the present invention achieve ZVS with a wider load range because of the larger value of the leakage inductance $L_{lk}$. The PWM scheme of U.S. Application No. 62/069,815 and PCT Application No. PCT/US2015/057887 is suitable for unidirectional switches such as IGBTs. The anti-parallel diode of the IGBT is not by-passed when the IGBT is conducting current because the current can only flow in one direction. The PWM scheme of Vlatković is suitable for bidirectional switches such as MOSFETs. The anti-parallel diode of the MOSFET is by-passed when the MOSFET is conducting current.

To minimize the effect of the duty cycle loss on the line-side current THD, the duty cycle of the primary switches can be compensated to maintain the effective duty cycle being consistent with the calculated dwell time (equation (3)) for $\vec{I}_1$, $\vec{I}_2$, and $\vec{I}_0$. As shown in FIG. 5A, the duty cycle loss happens during the dwell time of the vector $\vec{I}_x$. Therefore, the actual dwell time for the switching state associated with the vector $\vec{I}_x$ can be recalculated as:

$$T_x = T_1 = m_a T_s \sin\left(\frac{\pi}{6} - \theta\right) + T_s \Delta D_{total} \quad (16)$$

6) Output-Inductor Current Ripple

At steady state, the output-inductor current ripple varies with the phase angle $\theta$ as shown in FIGS. 6A and 6B. At $$\theta = -\frac{\pi}{6} \text{ or } \theta = \frac{\pi}{6},$$

the current ripple of the PWM scheme of the preferred embodiments reaches a maximum and can be derived from the following equation:

$$\Delta I_{max} = \frac{V_O\left(1 - \frac{\sqrt{3}}{2}m_a\right)T_s}{2L_{lk}}. \quad (17)$$

At $\theta=0$, the current ripple is a minimum and can be derived from the following equation:

$$\Delta I_{min} = \frac{V_O(1 - m_a)T_s}{2L_{lk}}. \quad (18)$$

As shown in FIGS. 6A and 6B, the maximum envelope of the current ripple (i.e., at $$\theta = -\frac{\pi}{6} \text{ and } \theta = \frac{\pi}{6})$$

in the PWM scheme of the preferred embodiments is lower than that of the known PWM scheme of Vlatković et al., while the minimum envelope of the current ripple (i.e., at $\theta=0$) in the PWM scheme of the preferred embodiments is higher than that of the known PWM of Vlatković et al. For the PWM of Vlatković et al., the dwell time of $\vec{I}_0$ is evenly divided and inserted between $\vec{I}_x$ and $\vec{I}_y$ as shown FIG. 5B. At $\theta=0$, the two pulses for vector $\vec{I}_y$ disappear, and the remaining two pulses are not evenly distributed, resulting in a larger current ripple as shown in FIG. 7B. By properly adjusting the dwell time of $\vec{I}_0$ between $\vec{I}_x$ and $\vec{I}_y$, it is possible to improve the current ripple of the known PWM scheme of Vlatković et al.

7) ZVS Operation Analysis

The ZVS operation of the switches in FIG. 1 is analyzed with reference to SVM. The analysis is for sector I(a), and the same analysis can be applied to sector I(b) and the other five sectors. In sector I(a), the active vectors involved in the ZVS operation are $\vec{I}_{x+}=\vec{I}_1$ and $\vec{I}_{y+}=\vec{I}_2$.

FIG. 13 shows mode 0 with freewheeling primary current $i_P$ during time $t_0^-=0$. As shown in FIG. 13, in mode 0, the primary current $i_P$ is freewheeling or circulating through switches $S_{11}$, $S_{21}$, $S_{14}$ and $S_{24}$. Mode 0 corresponds to time $t_{11}$ in FIG. 21. The primary voltage $v_P$, which includes the voltage $v_1$ and the voltage across the leak inductance $L_{lk}$, is clamped to zero. Because there is no current flowing through the three phases A, B, C, the current vector $\vec{I}_0$ in mode 0.

FIG. 14 shows mode 1 with vector transition from $\vec{I}_0$ to $\vec{I}_1$ ($\vec{I}_{x+}$) during time $t=[t_0, t_1]$. Mode 1 starts when switch $S_{24}$ is turned off as shown in FIG. 13. Then energy stored in the leakage inductance $L_{lk}$ starts transferring to the output capacitance of switches $S_{24}$, $S_{16}$, $S_{12}$ and $S_{22}$ because of the resonance between them. The primary current $i_P$ also starts resonating down to zero. At time $t_1$, when the voltage across the switch $S_{16}$ reaches zero, the diode $D_{16}$ starts conducting as shown in FIG. 16. To achieve ZVS of switch $S_{16}$, the energy stored in leak inductance $L_{lk}$ charges the total equivalent capacitance of capacitors $C_{24}$, $C_{16}$, $C_{22}$, and $C_{12}$. The parasitic capacitance of transformer Tr is also considered as part of the total equivalent capacitance. This resonance can be analyzed using the simplified circuit shown in FIG. 15. Because the input voltages between the phases A, B, C are constant during this resonant process, the phases A, B, C can be considered as short circuited. In the simplified circuit of FIG. 15, capacitors $C_{12}$ and $C_{22}$ are in series and in parallel with capacitors $C_{24}$ and $C_{16}$. The equivalent capacitance $C_{eq}$ can be calculated by:

$$C_{eq} = 5/2 C_o + C_{TR} \quad (19)$$

where $C_o$ is the output capacitance of each switch and $C_{TR}$ is the parasitic capacitance of the transformer Tr. The calculation of the equivalent capacitance is based on the assumption that the output capacitance $C_{eq}$ is constant at different voltages to simplify the analysis. More complex models can be used to derive a more accurate equivalent capacitance. The energy stored in the leakage inductance $L_{lk}$ charges the output capacitance $C_{eq}$ from 0 V to voltage $v_{AB}$. During mode 1, the primary voltage $v_1$ is clamped to zero because the primary current $i_P$ with respect to the load side is smaller than output-inductor current $i_L$, and the current difference between the primary current $i_P$ and the output-inductor current $i_L$ freewheels through the bridge rectifier that includes diodes D1, D2, D3, D4. Because the energy in the capacitance $C_{eq}$ is proportional to the square of the input line voltage, the worst case for achieving ZVS will occur when the voltage $v_{AB}$ is at its highest value, the energy $E_c$ needed to charge the capacitance $C_{eq}$ at the peak of the voltage $v_{AB}$ is $$E_c = 1/2 (\sqrt{3} V_m)^2 C_{eq} \quad (20)$$

Therefore, the minimum energy stored in the leakage inductance $L_{lk}$ should be equal to energy $E_c$. This analysis is exactly the same as for a FS-PS converter. At the end of mode 1, the voltage across the leakage inductance $L_{lk}$ is the voltage $v_{AB}$. The voltages across switches $S_{24}$, $S_{16}$, $S_{22}$, and $S_{12}$ are $v_{AB}$, 0, $-v_{AB}$, and $(v_{AC}-\frac{1}{2}v_{AB})$, respectively.

FIG. 16 shows mode 2 with linear current ramping during $t=[t_1, t_3]$. During mode 2, the voltage $v_{AB}$ appears across the leakage inductance $L_{lk}$ because the primary voltage $v_1$ is still clamped to zero and because the current difference between the reflected current of the primary current $i_P$ and the output-inductor current $i_L$ freewheels through the bridge rectifier. As a result, the primary current $i_P$ ramps up linearly from negative to positive. At time $t=t_2$, before the primary current $i_P$ crosses zero, the switch $S_{16}$ is turned on at zero voltage. Mode 2 ends when the primary current $i_P$ reaches the output-inductor current $i_L$ and, as a result, the line voltage $v_{AB}$ appears across the primary side of the transformer Tr and the vector transition from $\vec{I}_0$ to $\vec{I}_1$ is completed.

FIG. 17 shows mode 3 with energy transfer from the primary side to the secondary side with the current vector $\vec{I}_1$ ($\vec{I}_{x+}$) during time $t=[t_3, t_5]$. During mode 3, energy is transferred from the primary side to the secondary side as the line voltage $v_{AB}$ appears across the primary side of the transformer Tr. Because AC current enters into phase A and returns through phase B, the current vector is $\vec{I}_1$. The switch $S_{12}$ is turned on at time $t_4$ to prepare the vector transition from $\vec{I}_1$ to $\vec{I}_2$ in mode 4. Because the voltage across switch $S_{12}$ is not zero when it is turned on, turn-on losses occur. The turn-on losses depend on the switching voltage. As calculated in mode 1, the voltage across switch $S_{12}$ is $(v_{AC}-\frac{1}{2}v_{AB})$ and varies from 0 to $\frac{3}{4}V_m$ during one 30° interval. Because switch $S_{12}$ is operated without ZVS only during one 30° interval and because the switching voltage is low, the resulting switching losses are very low. Mode 3 ends when switch $S_{16}$ is turned off at time $t_5$.

FIG. 18 shows mode 4 with the current-vector transition from $\vec{I}_1(\vec{I}_{x+})$ to $\vec{I}_2(\vec{I}_{y+})$ during $t=[t_5, t_6]$. The body diode of switch $S_{22}$ is initially off with reversed voltage of $(v_C-v_B)$ before the current-vector transition. At time $t_5$, switch $S_{16}$ is turned off, and primary current $i_P$ begins to charge/discharge capacitors $C_{24}$, $C_{16}$ and $C_{22}$. Then the total equivalent capacitance $C_{eq}$ is the sum of the three capacitors $C_{24}$, $C_{16}$ and $C_{22}$ and the parasitic capacitance $C_{TR}$ of the transformer Tr, as shown by:

$$C_{eq} = 3 C_o + C_{TR} \quad (21)$$

where $C_o$ is the output capacitance of each switch.

At time $t_6$, the voltage across capacitor $C_{22}$ is discharged to zero, and, as shown in FIG. 19, diode $D_{22}$ starts conducting. At the end of mode 4, the vector transition from $\vec{I}_1$ to $\vec{I}_2$ is completed, and the line voltage $v_{AC}$ appears across the primary side of the transformer Tr. During the current-vector transition, the leakage inductance $L_{lk}$ is in series with the reflected output-filter inductor $L_o$, which is the equivalent inductance as seen from the primary side and the capacitors $C_{24}$, $C_{16}$ and $C_{22}$ are charged/discharged by the combined energy stored in both the leakage inductance $L_{lk}$ and output-filter inductor $L_o$ which is significantly larger than the energy required to charged/discharge the capacitors $C_{24}$, $C_{16}$ and $C_{22}$. Therefore, ZVS can be easily achieved. To achieve ZVS in this current-vector transition, the phase voltage $v_c$ should be higher than the phase voltage $v_B$, which is satisfied in sector I(a) only. In sector I(b), phase the voltage $v_B$ is higher than the phase voltage $v_C$. To achieve ZVS in sector I(b), the switch sequence of the two active vectors is reversed.

FIG. 19 shows mode 5 with energy transfer from the primary side to the secondary side using current vector $\vec{I}_2$ ($\vec{I}_{y+}$) during t=[t$_6$, t$_5$]. During Mode 5, energy is transferred from the primary side to secondary side as line voltage v$_{AC}$ appears across the primary side of the transformer Tr. Because AC current enters through phase A and returns through phase C, the current vector is $\vec{I}_2$. Switch S$_{22}$ is turned on at zero voltage at time t$_7$. Mode 5 ends when switch 512 is turned off.

FIG. 20 shows mode 6 with the current-vector transition from $\vec{I}_2$ ($\vec{I}_{y+}$) to $\vec{I}_0$ during time t=[t$_8$, t$_9$]. After switch S$_{12}$ is turned off, the primary current i$_P$ starts charging capacitors C$_{12}$ and C$_{16}$ and discharging capacitor C$_{24}$. At time t$_9$, the voltage across capacitor C$_{24}$ reduces to zero and the diode D$_{24}$ starts conducting as shown in FIG. 21. At the end of mode 6, the current-vector transition from $\vec{I}_2$ to $\vec{I}_0$ is completed, and the primary voltage v$_P$ is clamped to zero. The total equivalent capacitance C$_{eq}$ to be charged to achieve ZVS is same as that in Mode 4, and the combined energy stored in both L$_{lk}$ and L$_o$ is used to charge/discharge capacitance. The ZVS can be easily achieved.

FIG. 21 shows mode 7 with the current vector being $\vec{I}_0$ and with freewheeling $\vec{I}$ primary current during time t=[t$_9$, t$_{11}$]. During mode 7, the primary voltage v$_P$ is clamped to zero. The primary current i$_P$ freewheels through switches S$_{11}$, S$_{21}$, S$_{16}$ and diode D$_{24}$ (or switch S$_{24}$). Switch S$_{24}$ can be turned on at zero voltage after diode D$_{24}$ starts conducting. Because there is no current flowing through the three phases A, B, C, the current vector is $\vec{I}_0$. The mode 7 ends when switch S$_{11}$ is turned off, which completes half the operation cycle. The second half of the operation cycle is similar to the first half.

In summary, in Mode 1, bridge x is operating, and ZVS operation is similar to the leading leg operation of a FB-PS converter in which the energy stored in leakage inductance L$_{lk}$ is used to achieve ZVS. In Mode 6, bridge y is operating, and ZVS operation is similar to lagging leg operation of a FB-PS converter in which the total energy stored in leakage inductance L$_{lk}$ and the output-filter induct L$_o$ is used to achieve ZVS. The current-vector transition described in mode 4 involves both bridges x and y, which does not exist in conventional FB-PS converters. However, ZVS of this transition is similar to that of mode 6 in which the total energy stored in leakage inductance L$_{lk}$ and the output-filter inductor L$_o$ is used to achieve ZVS.

8) Simulations

FIGS. 8A and 8B are simulations comparing the PWM scheme of the preferred embodiments of the present invention with the known PWM scheme of Vlatković et al. The simulation model is setup at a rated power of 10 kW and m$_a$=0.8 under the following conditions:

(1) V$_{ab,rms}$=208 V,
(2) fundamental frequency f$_m$=60 Hz,
(3) output voltage V$_o$=400 V,
(4) input line inductor L$_f$=30 μH,
(5) commutation capacitor C$_f$=5 μF,
(6) output inductor L$_o$=450 μH,
(7) load resistance R$_o$=16 Ω,
(8) turns ratio n=2,
(9) leakage inductance L$_{lk}$=3.5 μH,
(10) switching frequency f$_{SW}$=100 kHz.

FIGS. 8A and 8B show a set of simulated waveforms for the three-phase matrix rectifier of FIG. 1, where v$_P$, v$_s$, V$_d$ are the primary side, the secondary side, and the output rectifier voltages; i$_P$, i$_L$ are the primary and output-inductor currents; and i$_a$, i$_b$, i$_c$ are the average (fundamental) phase currents of phase current i$_A$, i$_B$, i$_C$, respectively. FIG. 8C shows simulated line-side phase voltage and current.

When a large leakage inductance is required for extending ZVS at light load, the known PWM scheme of Vlatković et al. produces a larger THD compared to the PWM scheme of the preferred embodiments of the present invention. Based on the simulated waveforms in FIG. 8A, with the PWM scheme of the preferred embodiments, the inductor current ripple Δi$_L$(around $$\theta \approx -\frac{\pi}{6}$$

in FIG. 3) is reduced by 26% compared to the known PWM scheme of Vlatković et al. Based on the simulation results, the THD of the PWM scheme of the present preferred embodiment of the present invention is about 3.8%, for example. The simulation results are verified by the experimental results in FIGS. 9A and 9B that show the transformer primary voltage v$_1$ and inductor output current at θ=0 and at $$0 < \theta < \frac{\pi}{6} \text{ or } 0 > \theta > \frac{-\pi}{6}.$$

FIG. 10 shows the THD is less than about 3% at about 15% load, for example.

The line-current THD is within about 5%, and a unity power factor is achieved with the PWM scheme according to the preferred embodiments of the present invention. However, a small current distortion in the current waveform is observed. As shown in FIG. 8C, there is a sudden jump in current waveform (Δi$_a$=4 A). This current distortion is due to:

(1) Duty loss caused by the leakage inductance L$_{lk}$ that reduces the effective duty cycle. As shown in FIG. 8A, waveforms of phase currents i$_A$ and i$_B$ are not perfect square waves because the slope of the edge is determined by the leakage inductance L$_{lk}$. If a large leakage inductance is required to extend ZVS at light load, then the THD of line current might exceed the standard THD required by industry.

(2) The output inductor current ripple introduces errors in the dwell time calculation, which is based on the assumption that inductor current is constant in one switching cycle.

(3) The switching sequence is reversed in the transition from sector I(a) to sector I(b) in each sector, which causes a small sudden jump in current between the two phases. As shown in FIG. 11, the gap between two adjacent current pulses in phase currents i$_B$ and i$_C$ is suddenly changes due to the sequence change between sectors I(a) and I(b).

The SVM technique and PWM scheme of the preferred embodiments of the present invention are preferably implemented using a controller. In the preferred embodiments of the present invention, to calculate the dwell times of the PWM scheme, the controller measures transformer primary current i$_P$ (or inductor current i$_L$), line voltages u$_a$, u$_b$, u$_c$, and output voltage u$_o$. The controller can be any suitable controller, including, for example, a PI controller, a PID controller, etc. The controller can be implemented in an IC device or a microprocessor that is programmed to provide the functions discussed above. Any suitable controller can be used.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of operating a matrix rectifier, the matrix rectifier including:
   input phases A, B, and C, each of the input phases A, B, and C includes two bi-directional switches connected in series;
   a transformer connected to the input phases A, B, and C;
   a rectifier bridge connected to the transformer;
   a bridge x defined by phases A and B; and
   a bridge y defined by phases A and C;
   the method comprising:
   operating the bridges x and y as independent full-bridge phase-shifted converters in each 60° interval between two successive zero-voltage crossings of the input phases A, B, and C; wherein
   in a first 30° sector of each 60° interval, the bridges x and y are operated in a first vector sequence in every switching period where each vector represents a switch state of the bi-directional switches; and
   the first vector sequence is divided into a sequence of $\vec{I}_{x+}$, $\vec{I}_{y+}$, $\vec{I}_0$, $\vec{I}_{x-}$, $\vec{I}_{y-}$, $\vec{I}_0$, where $\vec{I}_{x+}$ and $\vec{I}_{x-}$ represent switching states of vector $\vec{I}_x$ for bridge x when $i_P>0$ and $i_P<0$, respectively, and where $\vec{I}_{y+}$ and $\vec{I}_{y-}$ represent switching states of vector $\vec{I}_y$ for bridge y when $i_P>0$ and $i_P<0$, respectively.

2. The method of claim 1, wherein a dwell time for each vector in the first vector sequence is $T_x/2$, $T_y/2$, $T_0/2$, $T_x/2$, $T_y/2$, and $T_0/2$, respectively, where $T_x$, $T_y$, and $T_0$ are dwell times for $\vec{I}_x$, $\vec{I}_y$, and $\vec{I}_0$, respectively.

3. The method of claim 1, wherein, in a second 30° sector of each 60° interval, the bridges x and y are operated in a second vector sequence in every switching period; and
   the second vector sequence is divided into a sequence of $\vec{I}_{y+}$, $\vec{I}_{x+}$, $\vec{I}_0$, $\vec{I}_{y-}$, $\vec{I}_{x-}$, $\vec{I}_0$.

4. The method of claim 3, wherein a dwell time for each vector in the second vector sequence is $T_y/2$, $T_x/2$, $T_0/2$, $T_y/2$, $T_x/2$, and $T_0/2$, respectively.

5. The method of claim 1, wherein unity power factor and output-voltage regulation are simultaneously achieved.

6. A matrix rectifier comprising:
   input phases A, B, and C, each of the input phases A, B, and C includes two bi-directional switches connected in series;
   a transformer connected to the input phases A, B, and C;
   a rectifier bridge connected to the transformer;
   a bridge x defined by the phases A and B;
   a bridge y defined by the phases A and C; and
   a controller that operates the bridges x and y as independent full-bridge phase-shifted converters in each 60° interval between two successive zero-voltage crossings of the input phases A, B, and C; wherein
   in a first 30° sector of each 60° interval, the controller operates the bridges x and y in a first vector sequence in every switching period where each vector represents a switch state of the bi-directional switches; and
   the first vector sequence is divided into a sequence of $\vec{I}_{x+}$, $\vec{I}_{y+}$, $\vec{I}_0$, $\vec{I}_{x-}$, $\vec{I}_{y-}$, $\vec{I}_0$, where $\vec{I}_{x+}$ and $\vec{I}_{x-}$ represent switching states of vector $\vec{I}_x$ for the bridge x when $i_P>0$ and $i_P<0$, respectively, and where $\vec{I}_{y+}$ and $\vec{I}_{y-}$ represent switching states of vector $\vec{I}_y$ for the bridge y when $i_P>0$ and $i_P<0$, respectively.

7. The matrix rectifier of claim 6, wherein a dwell time for each vector in the first vector sequence is $T_x/2$, $T_y/2$, $T_0/2$, $T_x/2$, $T_y/2$, and $T_0/2$, respectively, where $T_x$, $T_y$, and $T_0$ are dwell times for $\vec{I}_x$, $\vec{I}_y$, and $\vec{I}_0$, respectively.

8. The matrix rectifier of claim 6, wherein, in a second 30° sector of each 60° interval, the controller operates the bridges x and y in a second vector sequence in every switching period; and
   the second vector sequence is divided into a sequence of $\vec{I}_{y+}$, $\vec{I}_{x+}$, $\vec{I}_0$, $\vec{I}_{y-}$, $\vec{I}_{x-}$, $\vec{I}_0$.

9. The matrix rectifier of claim 8, wherein a dwell time for each vector in the second vector sequence is $T_y/2$, $T_x/2$, $T_0/2$, $T_y/2$, $T_x/2$, and $T_0/2$, respectively.

10. The matrix rectifier of claim 6, wherein unity power factor and output-voltage regulation are simultaneously achieved.

* * * * *